United States Patent
Yu

(10) Patent No.: US 9,958,874 B2
(45) Date of Patent: May 1, 2018

(54) AIRCRAFT ATTITUDE CONTROL METHODS

(71) Applicant: SZ DJI TECHNOLOGY CO., LTD., Shenzhen City, Guangdong (CN)

(72) Inventor: Yun Yu, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days. days.

(21) Appl. No.: 14/390,004

(22) PCT Filed: May 30, 2014

(86) PCT No.: PCT/CN2014/078999
§ 371 (c)(1),
(2) Date: Oct. 1, 2014

(87) PCT Pub. No.: WO2015/180171
PCT Pub. Date: Dec. 3, 2015

(65) Prior Publication Data
US 2017/0068252 A1    Mar. 9, 2017

(51) Int. Cl.
G05D 1/06 (2006.01)
G05D 1/08 (2006.01)
B64C 15/00 (2006.01)
B64C 29/00 (2006.01)

(52) U.S. Cl.
CPC ........... G05D 1/0858 (2013.01); B64C 15/00 (2013.01); B64C 29/0025 (2013.01)

(58) Field of Classification Search
CPC .... G05D 1/0858; B64C 15/00; B64C 29/0025
See application file for complete search history.

(56) References Cited

U.S. PATENT DOCUMENTS

2013/0306787 A1    11/2013    Marton et al.

FOREIGN PATENT DOCUMENTS

| CN | 101033973 A | 9/2007 |
|---|---|---|
| CN | 101445156 A | 6/2009 |
| CN | 102830622 A | 12/2012 |
| CN | 103365296 A | 10/2013 |
| CN | 103760905 A | 4/2014 |
| EP | 0752634 A1 | 1/1997 |
| EP | 1901153 A1 | 3/2008 |
| JP | H08110199 A | 4/1996 |
| JP | H09113196 A | 5/1997 |
| JP | 2005247009 A | 9/2005 |
| WO | WO 03/067351 A2 | 8/2003 |

OTHER PUBLICATIONS

International search report and written opinion dated Feb. 27, 2015 for PCT/CN2014/078999.
European search report and search opinion dated Mar. 15, 2017 for EP Application No. 14893562.0.

*Primary Examiner* — Michael D Lang
(74) *Attorney, Agent, or Firm* — Anova Law Group, PPLC

(57) ABSTRACT

Systems and methods are provided for aircraft attitude control. The aircraft attitude control may take physical parameters of the aircraft into account. For example, one or more aircraft configuration parameters, such as moment of inertia, motor lift curve, and/or axial distance may be calculated and/or taken into account based on the aircraft physical parameters. The aircraft configuration parameters may include non-linear parameters. The control systems may include feedback control systems, and may optionally use a feedforward and feedback control for angular acceleration.

30 Claims, 16 Drawing Sheets

AIRCRAFT ATTITUDE CONTROL METHODS

BACKGROUND OF THE INVENTION

Aerial vehicles such as unmanned aerial vehicles (UAVs) can be used for performing surveillance, reconnaissance, and exploration tasks for military and civilian applications. Such vehicles may carry a payload configured to perform a specific function. Aerial vehicles may be multi-rotor aerial vehicles.

Typical flight control methods for multi-rotor aerial vehicles utilize cascaded proportional-integral-derivative (PID) control in which attitude control is cascaded with angular velocity control. Based on conventional PID adjustment methods, the parameters for an inner loop of the control (angular velocity loop) and outer loop of the control (angle loop) are sequentially tuned. There is a strong dependence on the calibration results of the inner loop. If the inner loop tracking performance is not accurate, it will directly affect the entire result. However, the process of conventional PID tuning is complex and lengthy, and during the process, issues of system divergence and instability can easily occur. Furthermore, traditional control methods only make adjustments after disturbances have already caused the aerial vehicle to produce angular velocity, and under certain circumstances, disturbance rejection performance cannot achieve optimal state.

SUMMARY OF THE INVENTION

In some instances, it may be desirable for to control flight of an aerial vehicle, such as an unmanned aerial vehicle (UAV). It may be further desirable to control the attitude of the aerial vehicle during flight using a technique that is less complex or lengthy than traditional attitude control methods. A need exists to provide stable and controlled flight for aerial vehicles.

An aspect of the invention is directed to a method for controlling aircraft attitude, said method comprising: (a) calculating one or more aircraft configuration parameters based on one or more physical characteristics of an aircraft; (b) receiving, at a processor, a signal indicative of a target attitude of the aircraft; (c) generating, with aid of the processor, a command signal to be delivered to at least one actuator of the aircraft operably coupled to one or more propulsion units of the aircraft, wherein said generation is based on (1) the signal indicative of the target attitude of (b), and (2) the one or more aircraft configuration parameters of (a), and where said generation further uses a feedback control scheme; (d) measuring, with aid of one or more sensors operably coupled to the aircraft, dynamics of the aircraft resulting from actuation of the one or more propulsion units; and (e) feeding the dynamics to the processor to yield the feedback control scheme that adjusts or confirms the command signal of (c).

The aircraft may be an unmanned aerial vehicle. The aircraft may include a plurality of actuators operably coupled to a plurality of propulsion units. The propulsion units may include rotors that generate lift for the aircraft.

The signal indicative of a target attitude of the aircraft may be received from a remote controller over a wireless connection.

In some embodiments, the one or more physical characteristics may be input by a user. The one or more physical characteristics of the aircraft may include a physical dimension and weight. The method may include calculating an aerodynamic center and center of gravity of the aircraft. The method may also include calculating a moment of inertia for the aircraft. The calculation using the feedback controls system may include a feedforward calculation using the moment of inertia of the aircraft.

The calculation using the feedback control scheme may be performed for aircraft attitude about a pitch axis, roll axis, and yaw axis. The method may further include combining, using a mixer, results of the calculations about the pitch axis, roll axis, and yaw axis, and an aircraft configuration parameter to calculate the command signal to be delivered to the at least one actuator. The aircraft configuration parameter may be a distance from the actuator to an aerodynamic center of the aircraft. The one or more sensors may be inertial sensors.

The dynamics of the aircraft may include the attitude of the aircraft with respect to at least one axis, the angular velocity with respect to at least one axis, and the angular acceleration with respect to the at least one axis.

Additional aspects of the invention may be directed to an aircraft attitude control system comprising: one or more processors individually or collectively configured to: (a) calculate one or more aircraft configuration parameters based on one or more physical characteristics of an aircraft; (b) receive a signal indicative of a target attitude of the aircraft; and (c) generate a command signal to be delivered to at least one actuator of the aircraft operably coupled to one or more propulsion units of the aircraft, wherein said generation is based on (1) the signal indicative of the target attitude of (b), and (2) the one or more aircraft configuration parameters of (a), and wherein said generation uses a feedback control scheme; and one or more sensors operably coupled to the aircraft and configured to measure dynamics of the aircraft resulting from actuation of the one or more propulsion units, said measured dynamics being fed to the one or more processors to yield the feedback control scheme that adjusts or confirms the command signal of (c).

Optionally, the aircraft may be an unmanned aerial vehicle. The aircraft may include a plurality of actuators operably coupled to a plurality of propulsion units. The propulsion units may include rotors that generate lift for the aircraft.

The signal indicative of a target attitude of the aircraft may be received from a remote controller over a wireless connection.

The one or more physical characteristics may be input by a user. The one or more physical characteristics of the aircraft include a physical dimension and weight. The one or more processors can be individually or collectively configured to calculate an aerodynamic center and center of gravity of the aircraft. The one or more processors may be individually or collectively configured to calculate a moment of inertia for the aircraft. The calculation using the feedback controls system may include a feedforward calculation using the moment of inertia of the aircraft.

In accordance with some embodiments, the calculation using the feedback control scheme may be performed for aircraft attitude about a pitch axis, roll axis, and yaw axis. The system may include a mixer configured to combine results of the calculations about the pitch axis, roll axis, and yaw axis, and an aircraft configuration parameter to calculate the command signal to be delivered to the at least one actuator. The aircraft configuration parameter may be a distance from the actuator to an aerodynamic center of the aircraft. The one or more sensors may be inertial sensors.

The dynamics of the aircraft may include the attitude of the aircraft with respect to at least one axis, the angular velocity with respect to at least one axis, and the angular acceleration with respect to the at least one axis.

A method for controlling aircraft attitude may be provided in accordance with another aspect of the invention. The method may comprise: (a) assessing, with aid of a processor, a non-linear relationship between thrust of an actuator and actuator output; (b) receiving, at the processor, a signal indicative of a target attitude of an aircraft; (c) generating, with aid of the processor, a command signal to be delivered to at least one actuator of the aircraft operably coupled to one or more propulsion units of the aircraft, wherein said generation is based on (1) the signal indicative of the target attitude of (b), and (2) the non-linear relationship of (a), and wherein said generation uses a feedback control scheme; (d) measuring, with aid of one or more sensors operably coupled to the aircraft, dynamics of the aircraft resulting from actuation of the one or more propulsion units; and (e) feeding the dynamics to the processor to yield the feedback control scheme that adjusts or confirms the command signal of (c).

In some embodiments, the aircraft is an unmanned aerial vehicle. The aircraft may include a plurality of actuators operably coupled to a plurality of propulsion units. The propulsion units may include rotors that generate lift for the aircraft.

The signal indicative of a target attitude of the aircraft can be received from a remote controller over a wireless connection. The non-linear relationship may be input by a user. The non-linear relationship may be calculated during a calibration of one or more actuator of the aircraft. The method may include calculating an aerodynamic center and center of gravity of the aircraft based on one or more physical characteristics of the aircraft. The method may further comprise calculating a moment of inertia for the aircraft based on the physical characteristics of the aircraft. The calculation using the feedback controls system may include a feedforward calculation using the moment of inertia of the aircraft.

The calculation using the feedback control scheme may be performed for aircraft attitude about a pitch axis, roll axis, and yaw axis. The method may include combining, using a mixer, results of the calculations about the pitch axis, roll axis, and yaw axis, and an aircraft configuration parameter to calculate the command signal to be delivered to the at least one actuator. The aircraft configuration parameter can be a distance from the actuator to an aerodynamic center of the aircraft. The one or more sensors may be inertial sensors.

The dynamics of the aircraft may include the attitude of the aircraft with respect to at least one axis, the angular velocity with respect to at least one axis, and the angular acceleration with respect to the at least one axis.

Furthermore, aspects of the invention may provide an aircraft attitude control system comprising: one or more processors individually or collectively configured to: (a) assess a non-linear relationship between thrust of an actuator and actuator output; (b) receive a signal indicative of a target attitude of the aircraft; and (c) generate a command signal to be delivered to at least one actuator of the aircraft operably coupled to one or more propulsion units of the aircraft, wherein said generation is based on (1) the signal indicative of the target attitude of (b), and (2) the non-linear relationship of (a), and wherein said generation uses a feedback control scheme; and one or more sensors operably coupled to the aircraft and configured to measure dynamics of the aircraft resulting from actuation of the one or more propulsion units, said measured dynamics being fed to the one or more processors to yield the feedback control scheme that adjusts or confirms the command signal of (c).

In some embodiments, the aircraft may be an unmanned aerial vehicle. The aircraft may include a plurality of actuators operably coupled to a plurality of propulsion units. The propulsion units may include rotors that generate lift for the aircraft.

The signal indicative of a target attitude of the aircraft may be received from a remote controller over a wireless connection. The non-linear relationship may be input by a user. The non-linear relationship may be calculated during a calibration of one or more actuator of the aircraft. The one or more processors are individually or collectively configured to calculate an aerodynamic center and center of gravity of the aircraft based on one or more physical characteristics of the aircraft. The one or more processors may be individually or collectively configured to calculate a moment of inertia for the aircraft based on the physical characteristics of the aircraft. The calculation using the feedback controls system may include a feedforward calculation using the moment of inertia of the aircraft.

The calculation using the feedback control scheme may be performed for aircraft attitude about a pitch axis, roll axis, and yaw axis. Optionally, the system may include a mixer configured to combine results of the calculations about the pitch axis, roll axis, and yaw axis, and an aircraft configuration parameter to calculate the command signal to be delivered to the at least one actuator. The aircraft configuration parameter can be a distance from the actuator to an aerodynamic center of the aircraft. The one or more sensors may be inertial sensors.

The dynamics of the aircraft may include the attitude of the aircraft with respect to at least one axis, the angular velocity with respect to at least one axis, and the angular acceleration with respect to the at least one axis.

In accordance with additional aspects of the invention, a method for controlling aircraft attitude may be provided. The method may comprise: (a) receiving, at the processor, a signal indicative of a target attitude of an aircraft; (b) generating, with aid of the processor, a command signal to be delivered to at least one actuator of the aircraft operably coupled to one or more propulsion units of the aircraft, wherein said generation is based on the signal indicative of the target attitude of (a), and wherein said generation uses a feedback control scheme that includes (1) an angular acceleration loop with angular acceleration feedback and (2) direct feedforward calculation based on a target acceleration; (c) measuring, with aid of one or more sensors operably coupled to the aircraft, dynamics of the aircraft resulting from actuation of the one or more propulsion units; and (d) feeding the dynamics to the processor to yield the feedback control scheme that adjusts or confirms the command signal of (b).

The aircraft may be an unmanned aerial vehicle. The aircraft may include a plurality of actuators operably coupled to a plurality of propulsion units. The propulsion units may include rotors that generate lift for the aircraft.

The signal indicative of a target attitude of the aircraft may be received from a remote controller over a wireless connection. The method may further include calculating an aerodynamic center and center of gravity of the aircraft based on one or more physical characteristics of the aircraft. The method may further include calculating a moment of inertia for the aircraft based on the physical characteristics of the aircraft. The feedforward calculation may use the moment of inertia of the aircraft. The calculation using the feedback control scheme may be performed for aircraft attitude about a pitch axis, roll axis, and yaw axis.

The method may further include combining, using a mixer, results of the calculations about the pitch axis, roll axis, and yaw axis, and an aircraft configuration parameter to calculate the command signal to be delivered to the at least one actuator. The aircraft configuration parameter may be a distance from the actuator to an aerodynamic center of the aircraft. The one or more sensors may be inertial sensors.

The dynamics of the aircraft may include the attitude of the aircraft with respect to at least one axis, the angular velocity with respect to at least one axis, and the angular acceleration with respect to the at least one axis.

An aspect of the invention may be directed to an aircraft attitude control system comprising: one or more processors individually or collectively configured to: (a) receive a signal indicative of a target attitude of an aircraft; and (b) generate a command signal to be delivered to at least one actuator of the aircraft operably coupled to one or more propulsion units of the aircraft, wherein said generation is based on the signal indicative of the target attitude of (a), and wherein said generation uses a feedback control scheme that includes (1) an angular acceleration loop with angular acceleration feedback and (2) direct feedforward calculation based on a target acceleration; and one or more sensors operably coupled to the aircraft and configured to measure dynamics of the aircraft resulting from actuation of the one or more propulsion units, said measured dynamics being fed to the one or more processors to yield the feedback control scheme that adjusts or confirms the command signal of (c).

In some embodiments, the aircraft may be an unmanned aerial vehicle. The aircraft may include a plurality of actuators operably coupled to a plurality of propulsion units. The propulsion units may include rotors that generate lift for the aircraft.

The signal indicative of a target attitude of the aircraft may be received from a remote controller over a wireless connection. The one or more processors may be individually or collectively configured to calculate an aerodynamic center and center of gravity of the aircraft based on one or more physical characteristics of the aircraft. The one or more processors may be individually or collectively configured to calculate a moment of inertia for the aircraft based on the physical characteristics of the aircraft. The feedforward calculation may use the moment of inertia of the aircraft. In some implementations, the calculation using the feedback control scheme may be performed for aircraft attitude about a pitch axis, roll axis, and yaw axis.

The system may include a mixer configured to combine results of the calculations about the pitch axis, roll axis, and yaw axis, and an aircraft configuration parameter to calculate the command signal to be delivered to the at least one actuator. The aircraft configuration parameter may be a distance from the actuator to an aerodynamic center of the aircraft. The one or more sensors may be inertial sensors.

In accordance with some embodiments, the dynamics of the aircraft may include the attitude of the aircraft with respect to at least one axis, the angular velocity with respect to at least one axis, and the angular acceleration with respect to the at least one axis.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
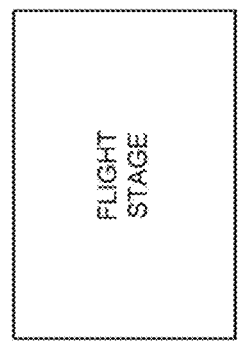
FIG. 1 shows an example of a multi-stage attitude control method, in accordance with an embodiment of the invention.
Figure 1:
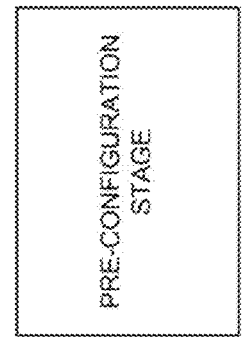

The systems, devices, and methods of the present invention provide attitude flight control for an aerial vehicle. The aerial vehicle may be an unmanned aerial vehicle (UAV), or any other type of movable object. The aerial vehicle may be a multi-rotor aerial vehicle.

Traditional attitude control methods for multi-rotor aircraft control schemes utilize cascaded proportional-integral-derivative (PID) control in which attitude control is cascaded with angular velocity control. Based on conventional PID adjustment methods, the parameters for an inner loop (angular velocity loop) and outer loop (angle loop) may be sequentially tuned.

With respect to traditional cascaded controllers, there is a strong dependence on the calibration results of the inner loop; if the inner loop tracking performance is not good, it will directly affect the entire result. Thus, the tuning of the design and parameters of the inner loop are extremely important. However, the process of conventional PID tuning is complex and lengthy, and during the process issues of system divergence and instability easily occur. Control parameters typically use actual tuning results as a standard, but are strongly system dependent. When the system changes (e.g., if there are changes in the aircraft structure, rotor distance, weight) it is necessary to tune the parameters anew. Moreover, the tuning cycle is still relatively long. The primary reason is due to a lack of complete understanding of the system model, and there is no relationship between the parameters.

Under conventional cascaded PID control, the inner angular velocity loop is primarily designed to resist velocity disturbances, so under normal circumstances the controller only makes adjustments after disturbances have already caused the aircraft to produce angular velocity. Under certain circumstances, disturbance rejection performance cannot achieve the optimal state.

Improved flight control methods and systems are provided herein. For instance, a flight attitude control method may take physical and/or dynamic parameters of an aerial vehicle into account. For instance, according to the aircraft structure and propulsion, performance limits may be automatically assessed, and used as references for control. Using an aerial vehicle model as a base, the physical and/or dynamic parameters may become controller coefficients. This may make it is easy to adjust the PID control for different aerial vehicle models. Pre-assessment may occur so that a control system may be differentiated for different aerial vehicle models and may be easily applied to different models. In some instances, non-linear parameters may be considered.

In some implementations, the physical parameters of the aerial vehicle may be assessed to determine a moment of inertia for the aerial vehicle as a whole. The physical parameters may also be assessed to calculate an aerodynamic center of the aerial vehicle, and determine an axial distance from a motor or propulsion unit of the aerial vehicle to the aerodynamic center. The physical parameters may also be used to determine a motor thrust/lift curve for one or more motors of the aerial vehicle. These parameters may be aircraft configuration parameters that may be used in the attitude control of the aerial vehicle. These parameters may be assessed in real-time or may be pre-assessed. Aircraft configuration parameters may be associated with various models of the aerial vehicle. An aerial vehicle model may be selected and the appropriate aircraft configuration parameters may be applied to the attitude control scheme.

Furthermore, improved flight control methods may include adding an angular acceleration loop to the PID control scheme. The flight control methods may also include doing direct control, and strengthening disturbance rejection and tracking performance. Since the angular acceleration loop can act as direct control, response time may be short with strong disturbance resistance characteristics. By directly suppressing disturbances, response time may be reduced.

FIG. 1 shows an example of a multi-stage attitude control method, in accordance with an embodiment of the invention. The multi-stage attitude control may be used to control an attitude of an aerial vehicle, such as a UAV or any other type of aircraft. The aircraft may be manned or unmanned. The aircraft may be a multi-rotor aircraft, which may include two or more rotors that may provide lift to the aircraft. The aircraft may be single-rotor aircraft. Any description herein relating to flight control of an aircraft may be applied to any other movable object. For example, the attitude control methods described herein may apply to spacecraft and/or underwater vehicles. One or more aspects of the attitude control may apply to aerial vehicles, outer space vehicles, land-bound vehicles, or aquatic vehicles.

The attitude control may be implemented about one or more axes of rotation about the aircraft. For example, the attitude control may be implemented about a pitch axis, roll axis, and/or yaw axis. The attitude control may be implemented about one of these axes, two of these axes, or all three of these axes.

An attitude control method may be implemented in multiple stages. For example, a pre-configuration stage and a flight stage may be provided. The pre-configuration stage and the flight stage may occur at different points in time and/or at different locations.

In one example, a pre-configuration stage may occur during which one or more physical parameters of an aircraft may be assessed. One or more calculations may be performed based on the physical parameters of the aircraft. The physical parameters of the aircraft may include spatial dimensions, such as height, width, length, diameter, diagonal, or circumference. The physical parameters may also take morphology of the aircraft into account, such as shape of the aircraft body and/or any extensions. The physical parameters may also take other factors into account, such as weight, weight distribution, center of gravity, or density. Further examples of physical parameters may be described elsewhere herein.

Dynamic parameters may be assessed during the pre-configuration stage. Alternatively, dynamic parameters may be considered at a later stage. Dynamic parameters may include battery-related specifications or other power source specifications, or motor characteristics, such as thrust or power. Further examples of dynamic parameters are described elsewhere herein.

The pre-configuration stage may occur for one or more models of aircraft. For example, different aircraft models may have different physical and/or dynamic parameters. For instance, different aircraft models may have different shapes, sizes, weights, weight distributions, power source characteristics, motor characteristics, or other different features or characteristics. In some instances, the pre-configuration may occur by a manufacturer or distributor of the one or more models of aircraft. The pre-configuration may occur via a manufacturer or distributor of a control system that may be applied to one or more models of aircraft. The pre-configuration may occur via any third party that may provide the information from the pre-configuration to aid in controlling the aircraft. The information may be stored in a memory that may be accessible by a flight controller controlling the aircraft. In some instances, the pre-configuration is not performed by an end user of the aircraft. For example, the pre-configuration may be performed an entity that is different from a user that is operating the aircraft. The pre-configuration may be performed before an end user has access to the aircraft. For example, the pre-configuration may occur hours, days, weeks, months, quarters, or years before the user has access to the aircraft or before the user operates the aircraft.

In some instances, the pre-configuration may be performed as a calibration of the aircraft. The calibration may occur before the user has access to the aircraft or may be independent of the user's interactions with the aircraft. The aircraft may be able to access the pre-configuration information. The pre-configuration information may be stored on-board the aircraft, or may be accessible via the aircraft from a memory off-board the aircraft.

Optionally, the flight stage may occur after the pre-configuration stage. The flight stage may be provided when a user has access to the aircraft. The flight stage may be when a user is able to operate the aircraft. During the flight stage, an attitude control method may be used on the aircraft. The attitude control systems may be used by the aircraft to control the attitude of the aircraft during flight. The attitude control systems may use pre-configuration information that may be collected earlier during a pre-configuration stage.

Additional calibrations may or may not occur at a flight stage. In one example, whenever a user turns an aircraft on, some calibrations may occur. Alternatively, calibrations may occur when the user first receives the aircraft and operates it for the first time. In another example, calibrations may occur upon request. Calibration information may or may not be used to determine physical dimensions of the aircrafts. Calibration information may or may not be used to determine dynamic characteristics of the aircraft. The flight-stage calibration information may or may not be coupled with the pre-configuration information for determining one or more coefficients for a flight attitude control method.

Figure 2:
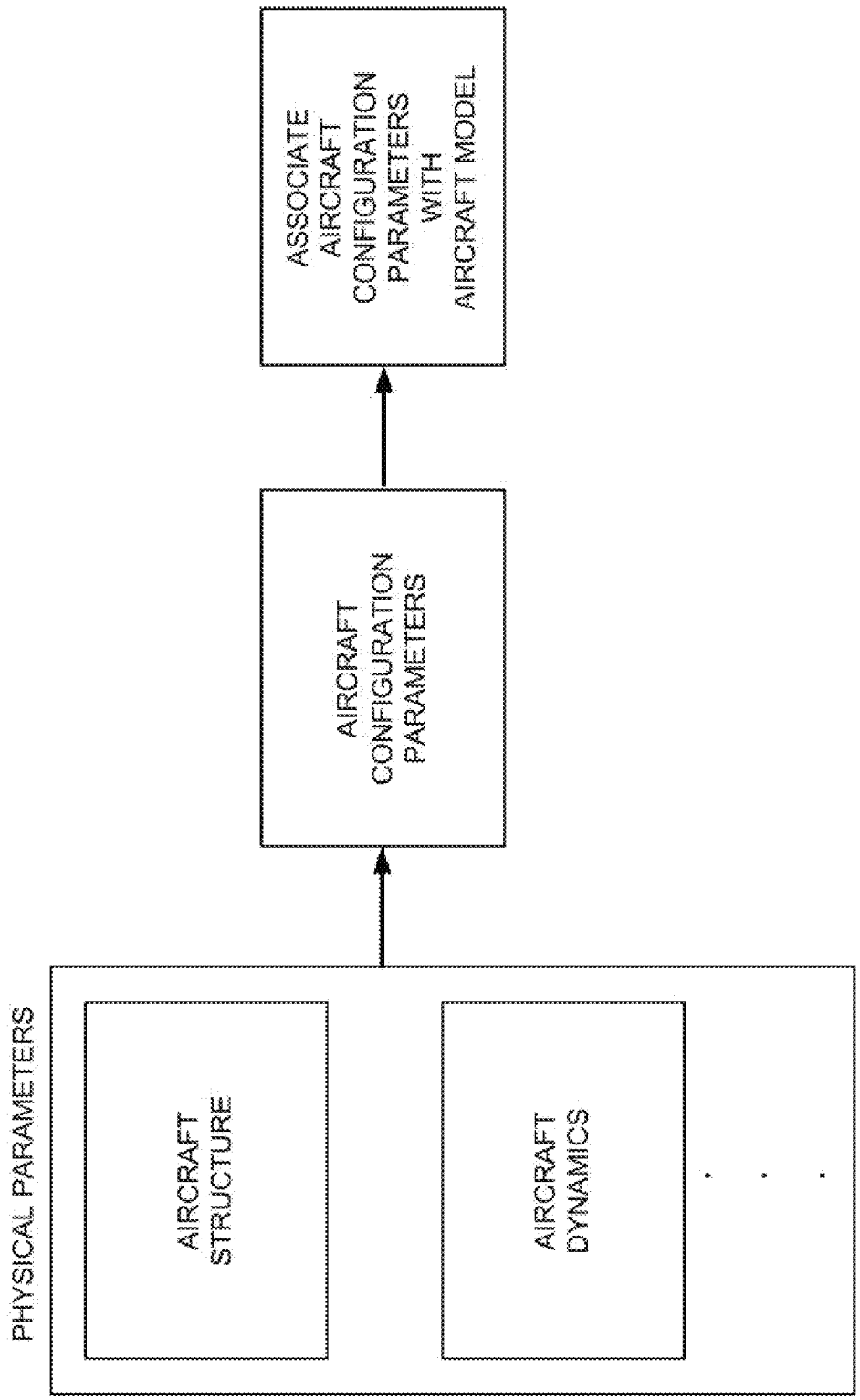
FIG. 2 shows an example of how physical parameters of an aircraft may be associated with an attitude control method for an aircraft, in accordance with an embodiment of the invention.

FIG. 2 shows an example of how physical parameters of an aircraft may be associated with an attitude control method for an aircraft, in accordance with an embodiment of the invention. In some instances, these steps may occur during a pre-configuration stage.

One or more physical parameters of an aircraft may be assessed. In some instances, these parameters may be measured manually by a human being, or may be measured automatically with aid of a processor. In some instances, a live being may enter the data, via a device, to be stored in memory. For example, a human being may measure a dimension of the aircraft and enter the data. In another example, one or more machines may be used to determine a physical parameter of the aircraft, and the data may be automatically provided to a memory storing the information. For example, the weight of the aircraft may be measured and automatically communicated into memory.

Examples of physical parameters may include factors relating to aircraft structure and/or aircraft dynamics. The physical parameters may include spatial dimensions, such as height, width, length, diameter, diagonal, or circumference. The physical parameters may also take morphology of the aircraft into account, such as shape of the aircraft body and/or any extensions. The physical parameters may also take other factors into account, such as weight, weight distribution, center of gravity, or density. In some instances, one or more material properties of the aircraft may be taken into account, such as density, rigidity, flexibility, or elasticity may be taken into account. Such physical parameters may relate to aircraft structure. The physical parameters may be gathered for the aircraft as a whole and/or one or more component of the aircraft. For example, the physical parameters may pertain to the aircraft frame, power source (e.g., battery), avionics system, carrier, payload, sensors, motors, landing gear, communication unit, or any other component.

Physical parameters may also include aircraft dynamics. This may include power source specifications, such as maximal battery current, maximal power output, energy density, battery capacity, discharge rate, rating voltage, battery life, or any other features. In some instances, information about battery chemistry or type of battery may be specified or determined. This may also include motor characteristics, such as thrust or power. In some instances, motor characteristics may include maximal trust, maximal power. Electronic speed control's current and power may also be determined.

Any other physical parameters relating to the aircraft may be assessed. Information about one or more of the aircraft physical parameters may be stored in memory. For example, the physical parameter data may be stored in one or more databases. The databases may be external to the aircraft. The databases may be stored in a cloud computing environment and/or may be distributed over multiple devices. Alternatively, the databases may be stored on-board the aircraft.

One or more calculations may be performed on the physical parameters to determine one or more aircraft configuration parameters. Physical parameters may represent physical characteristics of the aircraft that may be directly measurable. Aircraft configuration parameters may be calculated based on the physical parameters. Aircraft configuration parameters may be calculated with aid of a processor.

Some examples of aircraft configuration parameters that may include, but are not limited to, aircraft aerodynamic center, aircraft center of gravity, or moment of inertia of the entire aircraft or a component of the aircraft. The aircraft's aerodynamic characteristics and/or stability may be analyzed.

Figure 3:
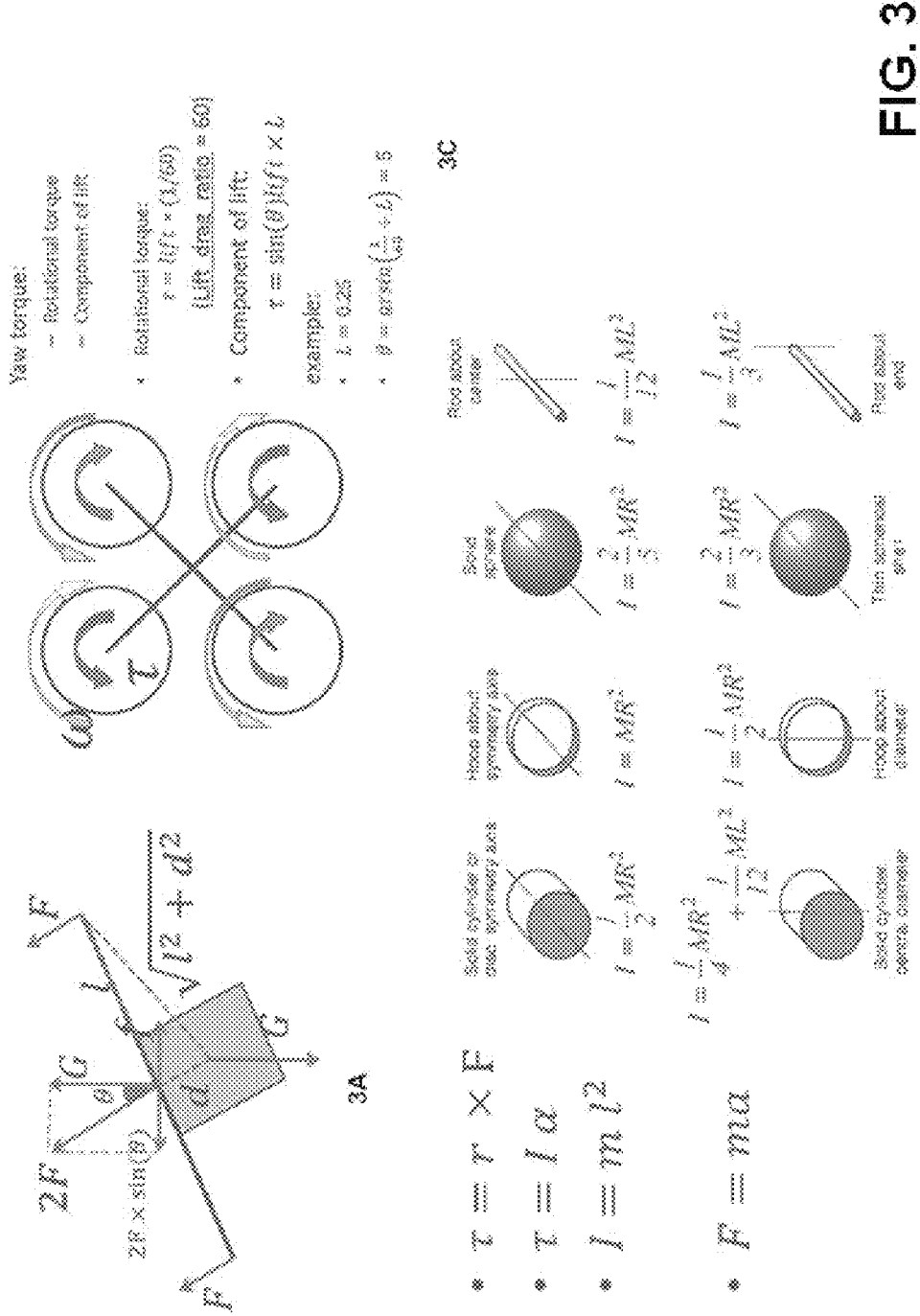
FIGS. 3A-D show examples of various physical characteristics that may be considered for one or more physical parameters of an aircraft, in accordance with an embodiment of the invention.

FIG. 3 shows an example of various physical characteristics that may be considered for one or more physical parameters of an aircraft, in accordance with an embodiment of the invention. FIG. 3A shows an example of how a center of gravity of an aircraft may be calculated. As shown, when the aircraft center of gravity is situated under the lift surface, when the aircraft lateral flight may reach a constant equilibrium velocity, the horizontal component of the lift force may counteract the drag force, and/or the vertical component may counteract gravity. In some instances, the aerodynamic center and gravity may or may not coincide. In a situation where the aerodynamic center and the center of gravity do not coincide, the vertical lift component and gravity may form a force couple, causing the aircraft to experience a nose-up pitching moment. This may cause the aircraft to tend towards the horizontal, which may permit the aircraft to become a stable system. Thus during aircraft design, the position of the center of gravity can be changed to adjust the aircraft's stability. The center of gravity of the aircraft may be calculated based on the physical parameters. In some instances, the weight distributions and positioning of various components of the aircraft may be considered to determine the center of gravity of the aircraft. The center of gravity may differ from aircraft model to aircraft model.

FIG. 3B shows an example of how a moment of inertia of the aircraft may be calculated. In some embodiments, the entire aircraft's moment of inertia distribution may be analyzed. The influence of the aircraft model and the configuration of the payload may be assessed for their effect on the entire aircraft's moment of inertia. These can be used as a reference to adjust the aircraft's entire configuration.

The basic physical models making up each component of an aircraft may be established. Examples of aircraft components may include, but are not limited to, aircraft frame, power source (e.g., battery), avionics system, carrier, payload, sensors, motors, propulsion units, landing gear, or communication unit. The basic models may include installation location, weight, and terms relating to each component's moment of inertia. Then, using the parallel axis theorem, the entire aircraft's moment of inertia based on the moments of inertia of each component. As illustrated, the shapes of the various components and/or the aircraft as a whole and weight distribution may be considered in calculating the moment of inertia. The moment of inertia may be calculated with aid of a processor based on the gathered physical parameters. In some implementations, finite element analysis (FEM) may be employed. The parallel axis theorem may be used in calculating the moment of inertial.

Some example of moment of inertia calculations may be provided as follows:
1) Particle:

$$I=M*L^2$$

2) About a portion of a cylinder:

$$I=\frac{1}{3}*M*L^2$$

3) About the center of a cylinder:

$$I=\frac{1}{2}*M*R^2$$

wherein I is the moment of inertia, M is the mass, L is the distance from the center of the particle or cylinder (or any other shape) to the axis of rotation and R is the radius of the cylinder.

Additional calculations may include torque and angular velocity calculations, which may be provided as follows:

$$torque=L*F$$

$$angular\ velocity=torque/moment\ of\ inertia$$

Based on theoretical analysis and calculation of a large number of aircraft models, the sought-for primary moment of inertia of the aircraft may be about 50% allocated by the electronics and propulsion unit (e.g., propellers/rotor blades). Because the moment of inertia and the rotor distance may be related by a squared relationship, and the torque increases linearly, with the same propulsion, under small rotor distance conditions there may be better drive characteristics, under large rotor distances there may be better stability characteristics.

Additionally, other aircraft configuration parameters that may be considered may include power source (e.g., battery) parameters, actuator (e.g., motor) parameters, and/or electronic speed control (ESC) parameters.

For instance, physical parameters may be used to calculate these aircraft configuration parameters. The maximal battery current, maximal power output, and/or energy density, the motor's maximal thrust and/or power, and/or the ESC maximal current and/or power may be assessed as follows.

$$battery\_current\_max=battery\_capacity*discharge\_rate$$

$$battery\_power\_max=battery\_current\_max*rating\_voltage$$

motor_max_thrust & power: from experiment esc_max_current & power: from experiment Furthermore, it may be desirable to assess the propulsion system's safety and/or compliance. For instance, it may be desirable that the current that can be provided by the battery>ESC's maximal current>motor's current.

An additional calculation of aircraft configuration parameters from physical parameters may include a hover performance assessment. For example, based on the aircraft's weight and dynamics, a calculation may be made for the hover power output, power usage amount, efficiency, power, and/or estimated hover time. The calculation may be performed with aid of a processor.

The motor output can be determined from accessing data regarding the motor in one or more databases. In some instances, the data regarding the motor may be a look up table based on the aircraft's weight and motor tension curve, and the efficiency can be determined from a look up table based on the motor output. The look up table may be created based on empirical test data. Alternatively, the look up table can be created based on simulated or projected data. In some instances, data on the loop up table may be entered by an individual. Optionally, the motor tension curve may be non-linear.

One or more hover characteristics may be calculated as follows:

$$hover\ power=weight/efficiency$$

$$hover\ current=hover\ power/voltage$$

$$time=battery\ capacity/hover\ current$$

Additionally, the physical parameters may be used to perform an actuation performance assessment. One or more aircraft configuration parameters from the actuation performance assessment may include, but are not limited to, thrust-to-weight ratio, parameters relating to speed (e.g., maximal ascending speed, maximal descending speed, upper speed limit based on designed braking distance), parameters relating to angle (e.g., theoretical maximum attitude angle, attitude angle after compensation, limit to attitude angle), parameters relating to torque (e.g., three-axis torque), parameters relating to angular velocity (e.g., using braking angle to calculate maximum angular velocity), parameters relating to motor rotation (e.g., calculate influence of motor rotation direction on a yaw axis, and/or associated compensation).

FIG. 3C shows an example of motor rotation direction on one or more control parameters, which may be aircraft configuration parameters. One or more of the aircraft configuration parameters may also be calculated as follows:

$$thrust\text{-}to\text{-}weight\ ratio=maximal\ thrust/weight$$

$$hover\ lift\ force\ (N)=entire\ aircraft\ weight\ (kg)*9.8\ (m/s^2)$$

$$hover\ throttle=look\ up(lift\ force),\ units:\ \%$$

$$hover\ efficiency=look\ up(hover\ throttle),\ units:\ g/watt$$

hover braking efficiency=look up(hover throttle), units: g/watt hover current=entire aircraft weight/efficiency hover time=battery capacity/hover current maximal attitude angle=arcos(hover lift force/maximal lift force)

As shown in FIG. 2, the aircraft configuration parameters may be calculated based on the one or more physical parameters from the aircraft. The aircraft configuration parameters may be associated with an aircraft model. For example, different aircraft models (e.g., UAV models, manned aircraft models) may have different physical parameters and associated aircraft configuration parameters. The aircraft configuration parameters may be collected and/or stored for each of the models. In some instances, some of the aircraft configuration parameters may include data that was received empirically, manually entered by a user, modeled or simulated, or calculated based on any existing data.

One or more aircraft configuration parameters may include controller parameters that may be used to tune an aircraft flight controller. For example, the aircraft's moment of inertia, motor tension curve, and dynamic acceleration/deceleration performance may be used to automatically tune controller parameters. Such tuning may occur according to tracking error. Using the aircraft configuration parameters may simplify the parameter tuning process and enhance controller performance.

In some embodiments, providing the aircraft's moment of inertia, motor lift output curve, and/or axial distance (e.g., distance from motor to aerodynamic center) may enhance controller performance. Such parameters may be useful for differentiating different aircraft models. Such parameters may be associated with an aircraft model. Thus, when a user receives an aircraft, the user may specify the aircraft model, or the aircraft model may already be pre-programmed in. The parameters for the specific aircraft models may be used in the flight control system to control attitude of the aircraft.

Figure 3D:
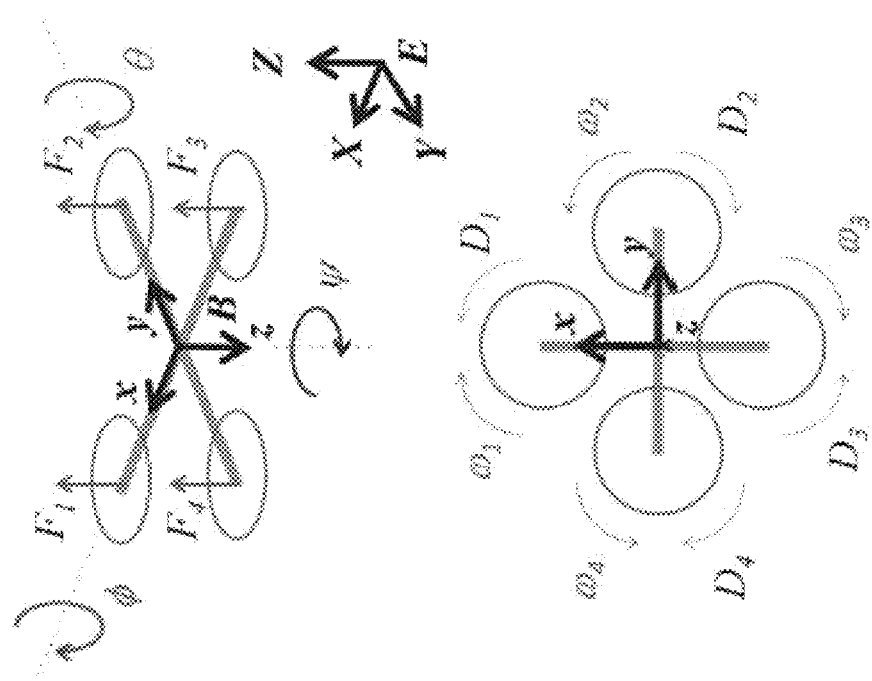

FIG. 3D illustrates a set of working principles for an aircraft in accordance with an embodiment of the invention. An aircraft may optionally have three degrees of freedom. For example, the aircraft may be capable of rotating about three axes of rotation, and for generating a lift force. For example, in a rotorcraft, the rotors may rotate to generate lift of the aircraft. The rotors may rotate to permit the aircraft to rotate about one, two, or three axes of rotation simultaneously. In some instances, the axes of rotation may be orthogonal to one another and/or may remain orthogonal to one another during the flight of the aircraft (e.g., $\theta$, $\varphi$, $\psi$). The axes of rotation may include pitch, yaw, and/or roll axes of rotation.

In some embodiments, the rotorcraft may have a plurality of rotors, each capable of generating lift for the rotorcraft (e.g., $F_1$, $F_2$, $F_3$, $F_4$). In one example, four rotors may be provided. The rotors may generate the same amount or lift or differing amounts of lift. The rotors may rotate with the same angular velocity, or with different angular velocities (e.g., $\omega_1$, $\omega_2$, $\omega_3$, $\omega_4$).

Robust and adaptive control strategy may be useful for a multi-rotor aircraft. The system governing flight of a multi-rotor aircraft may be unstable by nature, and may diverge in seconds if no proper control law is applied. The system may be nonlinear. The nonlinearity of the system and the complexity of aerial dynamics necessitate improvements in controller design.

The systems and methods described herein may model the dynamics of aircraft flight and develop a control scheme to stabilize the attitude of a multi-rotor aircraft, of which the configuration manifold can be nonlinear. The dynamics and proposed control system can be expressed on the special orthogonal group, SO(3), to avoid singularity and ambiguities associated with other attitude representations such as Euler angle and quaternion. Modeling of the multi-rotor aircraft can include kinematics and dynamics analysis of the multi-rotor and system identification of the actuators (e.g., motor, rotor, and/or propeller).

Finite element analysis (FEM) can be used to estimate the moment of inertia of the system. A first order inertia system with time delay may be considered as the approximate model for the system identification. The control system can be broken down into proportional control on SO(3) and cascade PID (proportional, integral and derivative) control of dynamics with feed-forward compensation, as described elsewhere herein. For control on SO(3), the error may be defined as the natural error on SO(3), (may be provided in terms of geodesic, which may be desirable). The proportional control may be defined on an exponential coordinate of SO(3), since it is a linear space. The control scheme can be verified by Lyapunov function to ensure the stability on a nonlinear manifold. For cascade PID control of dynamics, the controller may be organized in sequence of exponential coordinate of SO(3), angular velocity, and angular acceleration. Techniques using an incomplete differential PID controller and Smith predictor may be employed to further suppress the noise and improve the control quality. Furthermore, feed-forward compensation may be added to improve transient response. Further descriptions of control schemes for multi-rotor aircraft are described elsewhere herein.

Figure 4:
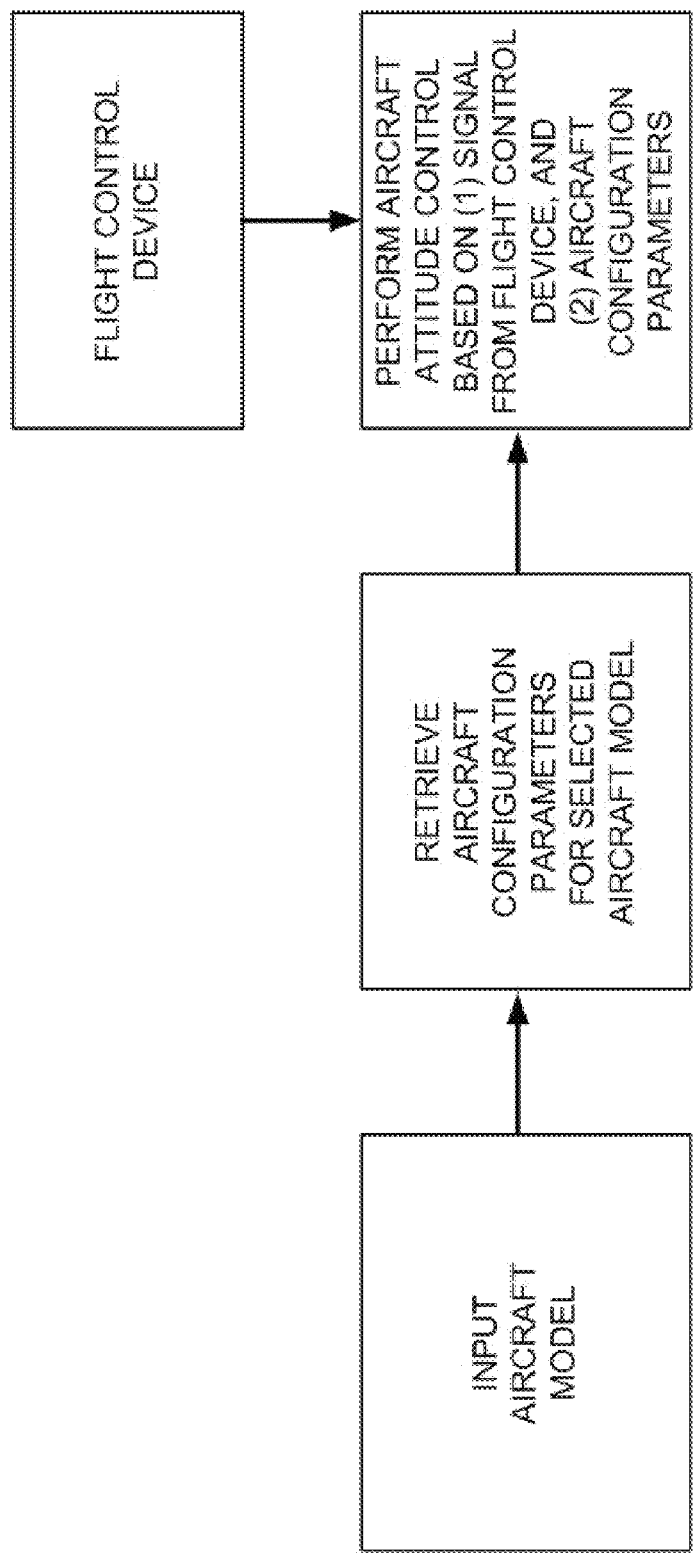
FIG. 4 shows an example of how an aircraft model may be used to determine one or more parameters in a control method for the aircraft, in accordance with an embodiment of the invention.

FIG. 4 shows an example of how an aircraft model may be used to determine one or more parameters in a control method for the aircraft, in accordance with an embodiment of the invention. For example, an aircraft may have one or more on-board processors that may function as a flight controller.

When a user receives an aircraft, the user may be able to input the aircraft model. For example, the user may input the aircraft model directly into the aircraft. In another example, the user may input the aircraft model into an external device that may communicate with the aircraft. The external device may be a controller of the aircraft or a display device that displays data from the aircraft. The external device may be a computer, smartphone, tablet, or any other type of device or terminal as described elsewhere herein.

In some instances, the aircraft may already be pre-programmed in with the aircraft model information. The aircraft model information may or may not be changeable.

In some embodiments, the aircraft model information may be used to access one or more aircraft configuration parameters for the selected aircraft model. In some instances, data may be stored in memory about one or more aircraft configuration parameters that may be associated with an aircraft model. For example, Aircraft Model A and Aircraft Model B may have one or more different physical characteristics. The different physical characteristics may result in different aircraft configuration parameters, such as different moments of inertia, motor lift output curve, and/or axial distance. The different aircraft configuration parameters may be used by a flight controller to control the flight of the aircraft. In some instances, the data may be stored as a lookup table, where the various configuration parameters for the different models of aircraft may be accessible. For example, if a request is made for configuration parameters for Aircraft Model X, they may be provided from the lookup table. In some instances, the lookup table may be stored on-board an aircraft. Thus, a user may enter or alter an aircraft model to define or alter the configuration parameters that are used by the flight controller. In other instances, the lookup table may be stored off-board the aircraft. The aircraft may be capable of communicating with an external device to access data from the lookup table. For example, the aircraft may send an indicator of an aircraft model, and the external device may send the aircraft configuration parameters associated with the selected aircraft model.

Optionally, an aircraft may have one or more aircraft configuration parameters pre-programmed therein. The aircraft configuration parameters may be stored on the aircraft when the user receives the aircraft. The user may or may not need to specify the aircraft model. In some instances, at a manufacturer site, or other site, a determination may be made about the aircraft model, and the flight controller may be pre-programmed with the aircraft configuration parameters that may be determined based on the physical parameters of the aircraft. The aircraft configuration parameters may be accessed from a lookup tables including data for multiple aircraft models. For example, at the manufacturer site, the manufacturer may specify that an Aircraft Model X is being manufactured, and the associated aircraft configuration parameters may be accessed and pre-programmed into the aircraft. A user may or may not be able to alter the aircraft configuration parameters. In some instances, a user may be able to enter a request for new configuration parameters for the aircraft (directly on the aircraft or via an external device capable of communicating with the aircraft). Such a request may be made based on an aircraft model, or may include entry of new physical characteristics of the aircraft. In some instances, the aircraft configuration parameters may be pre-calculated and may be stored in data and accessible upon request. In other instances, new physical parameter data may be entered or measured, and new aircraft configuration parameters may be calculated. Such calculations may occur in real-time. For example, a user may modify an existing aircraft in a way that may change one or more aircraft configuration parameters. For example, a user may add a new camera to a UAV which may change the weight and/or distribution of weight. The moment of inertia and/or other aircraft configuration parameters may be re-calculated to accommodate the change.

In some instances, information about an aircraft may be stored in an on-board memory and/or processor of the aircraft. The processor may evaluate one or more parameters when the aircraft is turned on. In some instances, the processor may access pre-calculated parameters based on the stored aircraft model. In other instances, some diagnostics or measurements may be taken when the aircraft is turned on and may be used to generate one or more aircraft configuration parameters.

During flight, an aircraft may be controlled by an input from a flight control device. The flight control device may be an external device that is separate from the aircraft. Optionally, the flight control device may be a remote control operated by a user on land while the aircraft is flying. The flight control device may communicate with the aircraft wirelessly. Alternatively, the flight control device may be built into the aircraft. For example, a user may operate the flight control device while the user is on-board the aircraft. The user may be a pilot of the aircraft and may operate the flight control device from the cockpit. The flight control device may include information that may pertain to direction and/or speed of the aircraft. The input from the flight control device may be used to determine a target attitude of the aircraft. The target attitude of the aircraft may be determined about one, two, or three axes of rotation. For instance, the target attitude of the aircraft may be determined about a pitch axis, roll axis, and/or yaw axis.

An aircraft may have a flight controller. The flight controller may include one or more processors on-board the aircraft. The flight controller may receive signals indicative of the input from the flight control device. The flight controller may control flight of the aircraft in response to the input from the flight control device. The flight controller may control flight of the aircraft in response to one or more of the aircraft flight configuration parameters. The flight controller may perform aircraft attitude control based on the signal from the flight control device (e.g., target attitude), and the aircraft configuration parameters. The flight controller may perform attitude control about the roll, yaw, and pitch axes of the aircraft based on target roll, yaw, and pitch axes, and the aircraft configuration parameters.

Figure 5:
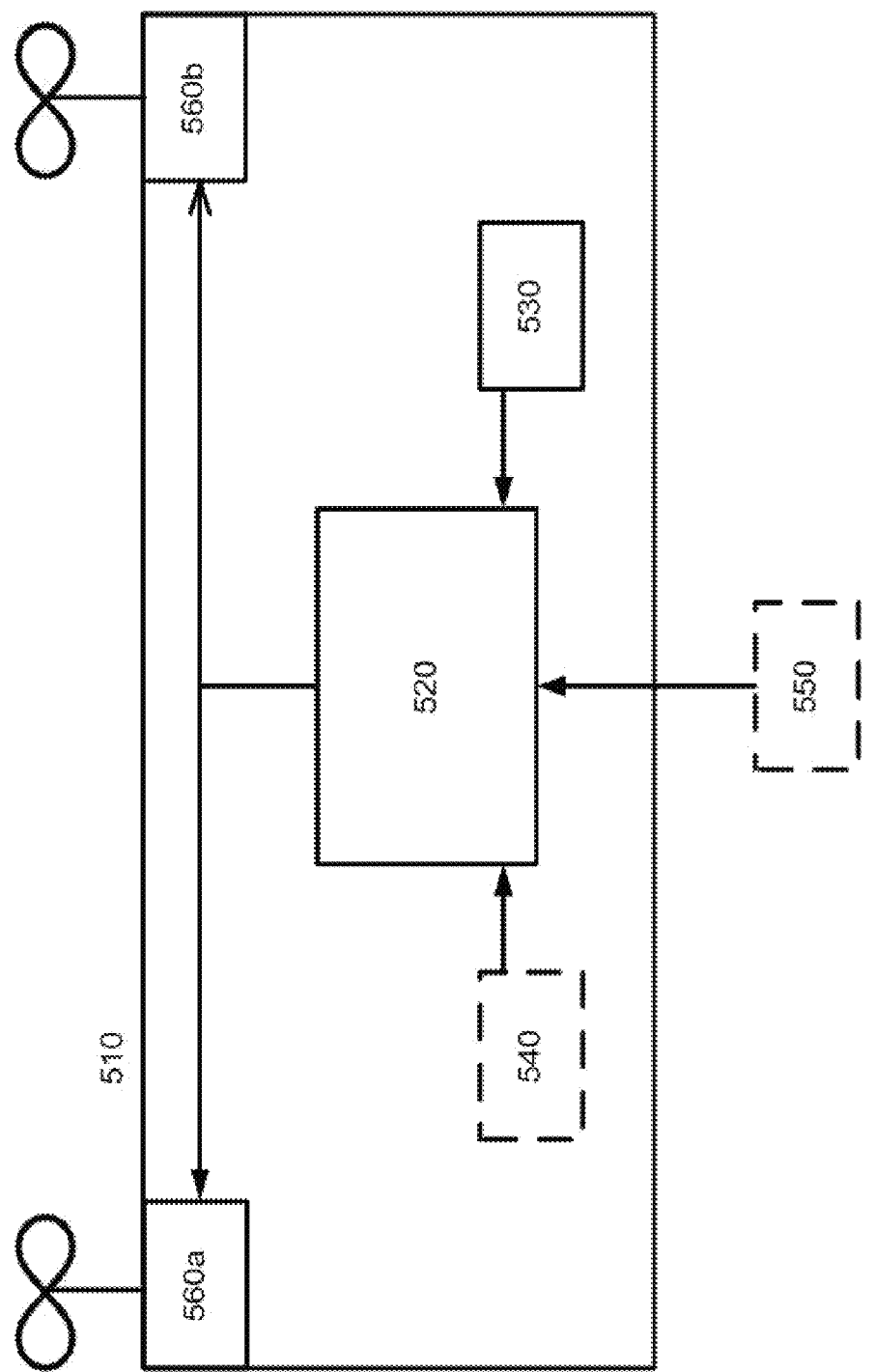
FIG. 5 shows an example of an aircraft with a flight controller, in accordance with an embodiment of the invention.

FIG. 5 shows an example of an aircraft with a flight controller, in accordance with an embodiment of the invention. The aircraft 510 may have one or more on-board flight controller 520. The flight controller may include one or more processors that may individually or collectively generate a command signal to control the flight of the aircraft.

The flight controller 520 may communicate with one or more actuator 560a, 560b of the aircraft. The actuators may be motors that may be coupled to one or more propulsion units of the aircraft. The propulsion units may include rotors that may be rotate to generate lift for the aircraft. In some instances, the aircraft may be a multi-rotor aircraft having a plurality of rotors, each of which may generate lift for the aircraft. The command signal may determine the output provided to the motors, which may determine the speed at which the rotors coupled to the motors may rotate. In some instances, each rotor may be coupled to an individual motor. Optionally, one rotor may be coupled to multiple rotors, or multiple motors may be used to drive a single rotor. The motors may be individually controllable. For example, one motor may have a different power output than another motor in different circumstances. The propulsion units may all be the same type of propulsion units or may include different types of propulsion units. For example all propulsion units may include rotor blades/propellers. In some embodiments, the rotor blades and/or propellers may have the same configuration and/or dimensions or different configurations and/or dimensions. Any number of motors and/or propulsion units may be provided for an aircraft. For example, one, two, three, four, five, six, seven, eight, nine, ten, eleven, twelve, or more motors and/or propulsion units may be provided on-board the aircraft.

Each motor may be controlled individually. For example, a separate command signal may be provided to each motor. Each motor may have the same or different motor output as other motors of the aircraft. The output to each motor may vary depending on the desired target attitude of the aircraft. For example, if it is desirable to adjust the attitude of the aircraft, one or more motors may operate at different outputs (e.g., may rotate with different speeds or rpm) to create the change in the attitude of the aircraft.

In some instances, memory including one or more aircraft configuration parameters 530 may be provided on the aircraft. The aircraft configuration parameters may include moment of inertia for the entire aircraft, motor lift output curve, and/or axial distance (e.g., distance from motor to aerodynamic center). Other aircraft configuration parameters may be stored, such as those described elsewhere. The aircraft configuration parameters may be derived from one or more physical characteristics of the aircraft or aircraft model. The aircraft configuration parameters may be pre-programmed into the memory. Alternatively, the aircraft configuration parameters may be downloaded from an external device into the memory. The aircraft configuration parameters may be stored in the memory and may be used the flight controller 520 in generating the command signal.

Optionally, one or more sensors 540 may be provided on-board the aircraft. Examples of sensors may include, but are not limited to imaging devices (e.g., cameras, vision sensors, infra-red/thermal imaging devices, IN imaging devices, or other types of spectral imaging devices), inertial sensors (e.g., gyroscopes, accelerometers, magnetometers), ultrasonic sensors, lidar, sonar, or any other type of sensor. In some instances, the sensor may communicate with an external device, such as a global positioning system (GPS) satellite. The sensor may be a GPS receiver. In other instances, the sensor may communicate with one or more towers or relays. The sensors may gather information about the environment surrounding the aircraft. The sensors may or may not be used to aid in navigation of the aircraft. In some instances, the sensors 540 may communicate with the flight controller 520 of the aircraft. In some instances, signals from the sensors may be used by the flight controller in generating a command signal to one or more actuator. The signals from the sensors may or may not be used in controlling the attitude of the aircraft about one or more axes.

In some instances, the sensors may be useful in gather information about aircraft dynamics. For example, the sensors may be used to gather information about the aircraft attitude, angular velocity, and/or angular acceleration about one or more axes of rotation. For example, the sensors may include gyroscopes or other sensors that may gather information about aircraft attitude, angular velocity, and/or acceleration about a pitch axis, roll axis, and/or yaw axis. The sensors may be inertial sensors or may be part of an inertial measurement unit (IMU). An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU can be rigidly coupled to the aerial vehicle such that the motion of the aerial vehicle corresponds to motion of the IMU. Alternatively the IMU can be permitted to move relative to the aerial vehicle with respect to up to six degrees of freedom. The IMU can be directly mounted onto the aerial vehicle, or coupled to a support structure mounted onto the aerial vehicle. The IMU may be provided exterior to or within a housing of the movable object. The IMU may be permanently or removably attached to the movable object. The IMU can provide a signal indicative of the motion of the aerial vehicle, such as a position, orientation, velocity, and/or acceleration of the aerial vehicle (e.g., with respect to one, two, or three axes of translation, and/or one, two, or three axes of rotation). For example, the IMU can sense a signal representative of the acceleration of the aerial vehicle, and the signal can be integrated once to provide velocity information, and twice to provide location and/or orientation information. The IMU may be able to determine the acceleration, velocity, and/or location/orientation of the aerial vehicle without interacting with any external environmental factors or receiving any signals from outside the aerial vehicle.

An IMU may provide a signal to the flight controller 520 which may be useful in generating a command signal to one or more motors 560 of the aerial vehicle. In some instances, the flight controller may use a control feedback scheme that may utilize information from the IMU.

Other sensors may be utilized to determine the attitude, angular velocity, and/or angular acceleration of the aircraft. The other sensors may or may not be on-board the aircraft. The other sensors may or may not communicate with additional devices that are external to the aircraft. For instance, the sensors may be able to determine the information without receiving any external signal from the aircraft.

Optionally, an external device 550 may be in communication with the flight controller. The external device may be provided off-board the aircraft. The external device may be capable of communicating with the aircraft wirelessly. The external device may have any information, such as navigation or positional information relating to the aircraft. In some instances, the external device may include aircraft configuration parameter data. Optionally, the external device may communicate aircraft configuration parameter data to a memory 530 storing aircraft configuration parameter data for the aircraft. The data on-board the aircraft may be updated with new data from the external device. The updates may be made automatically or in response to a request from a user or from the aircraft.

In some implementations, the external device may be a flight control device which may provide one or more flight instructions to the flight controller. For example, a user may use a remote controller that may communicate wirelessly with the aircraft. The user may specify different flight instructions, such as programming a predetermined path or providing instructions in real-time. The flight instructions may include information about a target attitude of the aircraft about one or more axes. For example, the flight instructions may result in an instruction to adjust the attitude of an aircraft by a certain amount. The instructions may or may not also include information about a target angular velocity and/or target angular acceleration of the aircraft.

The flight controller 520 may generate a command signal to the one or more actuators 560*a*, 560*b* of the aircraft, which may result in operation of the propulsion units to control the flight of the aircraft. This may include attitude control of the aircraft about three orthogonal axes (e.g., pitch, yaw, and roll). The flight controller may calculate the command signal based on one or more aircraft configuration parameters 530 that may be derived from and represent physical characteristics of the aircraft, feedback input about the aircraft attitude (e.g., information about the aircraft's attitude, angular velocity, and/or angular acceleration about the three orthogonal axes), and one or more flight instructions from a flight control device 550, which may optionally be external to the aircraft. The flight controller may use feedback control, incorporating the flight configuration parameters, to control the attitude of the aircraft.

Figure 6A:
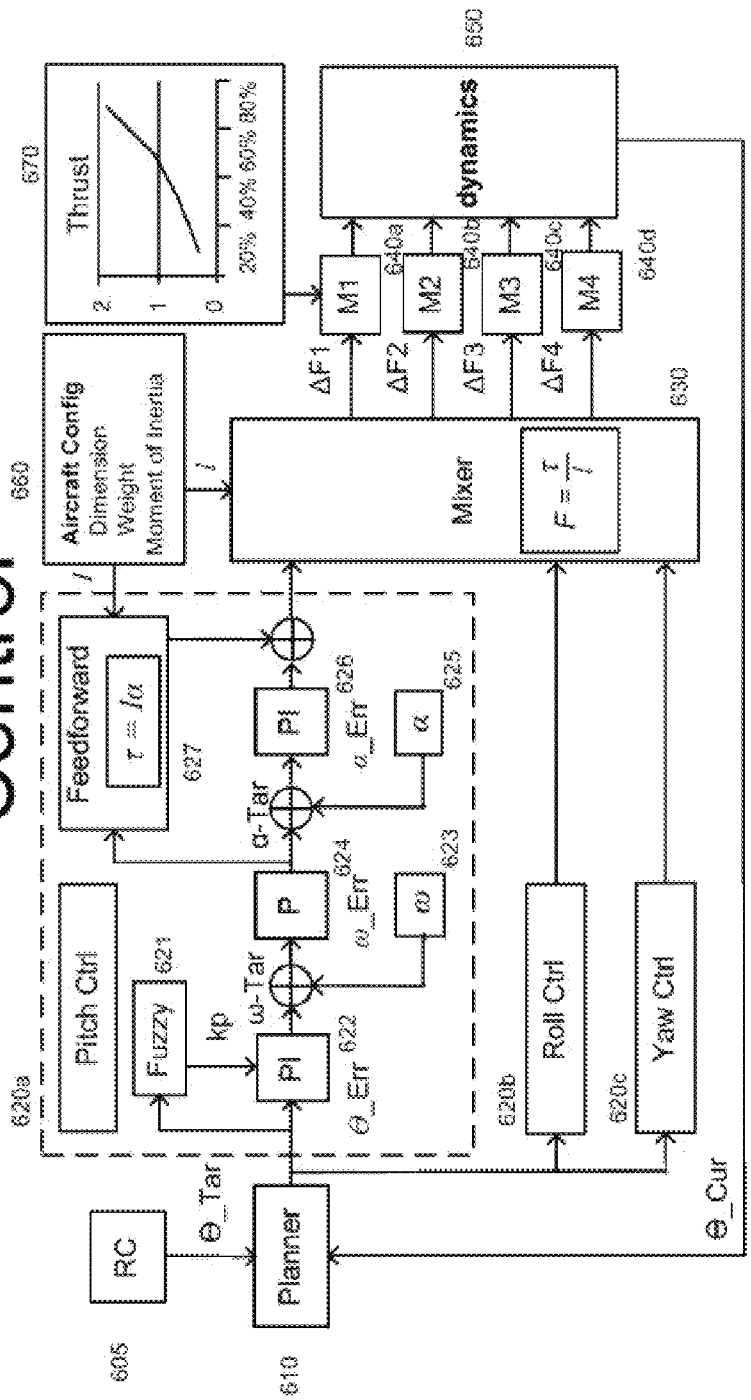
FIG. 6A shows an example of an attitude control scheme that may be implemented by an aircraft, in accordance with an embodiment of the invention.

FIG. 6A shows an example of an attitude control scheme that may be implemented by an aircraft, in accordance with an embodiment of the invention. The attitude control scheme may be used to control the attitude of the aircraft about one, two, or three axes. For example, the attitude control scheme may be used to control the attitude of the aircraft about the pitch axis, roll axis, and yaw axis.

A flight planner 610 may be provided to generate a command signal that determines the flight of the aircraft. The flight planner may be provided on-board the aircraft, or may be provided off-board the aircraft and may communicate with the aircraft. The flight planner may include one or more memory units, and one or more processors that may individually or collectively perform one or more of the steps provided herein. The memory may include non-transitory computer readable media, that may comprise code, logic, or instructions for performing one or more steps as described herein. The one or more processors may perform the one or more steps in accordance with the non-transitory computer readable media.

A remote controller 605 or other type of flight control device may be provided in accordance with an embodiment of the invention. The remote controller may be operated by a user to control the flight of the aircraft. This may include location of the aircraft, as well as angular orientation of the aircraft. In some instances, the user may directly input instructions regarding aircraft flight in real-time. For example, the user may provide an input to adjust an attitude of the aircraft. In other instances, the user may provide instructions for the aircraft to follow a predetermined or pre-programmed path. In some instances, the remote controller may be separated from the aircraft and may communicate with the aircraft via a wireless connection. In other instances, a flight control device may be built into the aircraft and any description herein of a remote controller may also apply to a flight control device that is part of the aircraft. For example, a user may be on-board the aircraft and provide instructions for flight via the on-board flight control device.

The remote controller 605 may provide a signal indicative of one or more target attitude θ_Tar to the planner 610. The target attitude may be a target attitude for the aircraft about one, two, or three axes of rotation. For example the target attitude may be indicative of the attitude of the aircraft about the pitch, roll, and yaw axes. The planner may calculate one or more signal to be provided to motors of the aircraft to attempt to achieve the target attitude.

The planner 610 may also receive information about the aircraft dynamics 650. In some instances, the information about the aircraft dynamics may be provided by one or more sensors. In one example, information about the aircraft dynamics may be provided from one or more inertial sensors (e.g., one or more gyroscopes or accelerometers) from on-board the aircraft. The information about aircraft dynamics may include attitude, angular velocity, and/or angular acceleration about one, two, or three of the following axes: pitch axis, roll axis, and yaw axis. In one example, the current attitude of the aircraft θ_Cur may be conveyed to the planner. The planner may compare the target attitude θ_Tar with the current attitude θ_Cur. This comparison may occur about each of the pitch, roll, and yaw axes. The difference in angle may be determined to be the error in attitude θ_Err.

Although only pitch control 620a is shown in detail, the same control scheme may also apply to the roll control 620b and the yaw control 620c. Any discussion of pitch control or any angular control in general may be applied to any or all of these axes. Any description of attitude, angular velocity, and/or angular acceleration may be applied to any or all of these axes. The three axes may be decoupled from one another.

The error in attitude θ_Err may be used with fuzzy logic 621 to control the angle of the aircraft. The control may be a feedback control. In some instances, the feedback control may use proportional, integral, and/or derivative control schemes. The feedback control may be a fuzzy proportional-integral-derivative (PID) control. In some instances, the target attitude may be proportional-integral (PI) or HD controlled 622. An angle control loop may be provided.

A target angular velocity ω_Tar may result. The target angular velocity may be compared with a measured angular velocity ω 623. The measured angular velocity may be part of the aircraft dynamics 650 that may be measured via one or more sensors. The target angular velocity may be compared with the measured angular velocity to determine an error in angular velocity ω_Err.

The error in angular velocity ω_Err may or may not be used with fuzzy logic to control the angular velocity of the aircraft. The control may be a feedback control. In some instances, the feedback control may use proportional, integral, and/or derivative control schemes. The feedback control may be a proportional-integral-derivative (PID) control. In some instances, the target angular velocity may be proportional (P) controlled 624. An angular velocity loop may be provided.

A target angular acceleration α_Tar may result. The target angular acceleration may be compared with a measured angular acceleration α 625. The measured angular acceleration may be part of the aircraft dynamics 650 that may be measured via one or more sensors. The target angular acceleration may be compared with the measured angular acceleration to determine an error in angular acceleration α_Err.

The error in angular acceleration α_Err may or may not be used with fuzzy logic to control the angular acceleration of the aircraft. The control may be a feedback control. In some instances, the feedback control may use proportional, integral, and/or derivative control schemes. The feedback control may be a proportional-integral-derivative (PID) control. In some instances, the target angular acceleration may be proportional-integral (PI) or PID controlled 626. An angular acceleration loop may be provided.

A feedforward loop 627 may also be provided. The feedforward loop may be provided for angular acceleration. For example, the target angular acceleration α_Tar may be used in the feedforward loop. In some instances, one or more aircraft configuration parameters 660 that may be derived from one or more physical characteristics of the aircraft may be incorporated into the feedforward loop. For example, a moment of inertia of the aircraft I may be provided to the feedforward loop. In one example, a torque of the aircraft τ may be calculated as the target angular acceleration α_Tar multiplied by the moment of inertia I. Thus, the angular acceleration loop may use the moment of inertia to directly calculate the output, and simultaneously according to the current angular acceleration value may perform the PID control as a compensation amount.

Thus, both feedforward and feedback may be used for control of the angular acceleration. The feedforward model parameters can improve response time of the control system, while the feedback control can compensate for model errors and dynamic disturbances. Since the angular velocity control can be directly regarded as the entire aircraft's roll torque control, the response time to external disturbances can be even shorter and the suppression effect better than system that do not use this control scheme. The feedforward loop may enable the angular acceleration loop to act as a direct control, so the response time may be short. Disturbances may be directly suppressed, reducing response time.

A mixer 630 may be provided in accordance with an embodiment of the invention. The mixer may be part of a flight controller in accordance with an embodiment of the invention. The mixer may include one or more processors that may or may not be the same as the processors used for the flight planner 610. The mixer may receive information pertaining to the attitude for the pitch control, roll control, and/or yaw control. For instance, data after the feedforward and feedback loop pertaining to the angular acceleration may be provided to the mixer for each of the axes of rotation 620a, 620b, 620c. The overall calculation results may be summed.

The mixer 630 may receive information regarding an aircraft configuration parameter 660. The aircraft configuration parameter may be derived from a physical characteristic of the aircraft or aircraft model. In one example, the mixer may receive an axial distance L for the aircraft. The axial distance may be the distance between a motor and an aerodynamic center of the aircraft. Alternatively, the axial distance may be a distance between a propulsion unit and an aerodynamic center of the aircraft. In some instances, an aircraft may have multiple motors 640a, 640b, 640c, 640d. The axial distance may be the same for each of the motors. Alternatively, the different motors may have different axial distances. In some instances, the axial distance may be a distance between the aerodynamic center and an axis passing through a propulsion unit and/or rotor in a direction of thrust created by the propulsion unit.

The mixer 630 may calculate a desired force to be exerted by each propulsion unit. The force may be calculated based on the aircraft configuration parameter 660 and the information from the control schemes for each of the axes of rotation 620a, 620b, 620c. The torque τ calculated in the feedforward loop 627 may be used, as well as the axial distance L to calculate the force for each motor. The force F may be calculated as τ/L. The desired additional force to be exerted on each motor may be calculated by the mixer. The desired additional force may be conveyed as a command signal to each motor. The forces for each motor may be the same or may differ. For example, for a first motor M1 640a, the desired force may be ΔF1, for a first motor M2 640b, the desired force may be ΔF2, for a first motor M3 640c, the desired force may be ΔF3, and/or for a first motor M4 640d, the desired force may be ΔF4. The motor may operate at a level to generate the desired force, or approximately the desired force. In some instances, a motor lift curve 670 may be used in determining motor output. The curve may include lift generated per percentage of motor operation. The motor lift curve may be thrust per percentage operation. The curve may show a non-linear relationship. The motor lift curve may be an aircraft configuration parameter that may be derived from one or more physical characteristics of the aircraft. One or more of the aircraft configuration parameters derived from one or more physical parameters may be non-linear parameters.

The output from the motors 640a, 640b, 640c, 640d may be used to drive one or more propulsion units of the aircraft. This may determine positioning, velocity, and/or acceleration of the aircraft. The output from the motor may affect the attitude, angular velocity, and/or angular acceleration of the aircraft. Any number of motors and/or propulsion units may be provided. The command signal to be generated to determine the output for each motor may be individually determined to direct the aircraft to target attitude from the remote controller.

The dynamics 650 system may register positional information relating to the aircraft. For example, one or more inertial sensors may determine the aircraft attitude, angular velocity, and/or angular acceleration, and the information may be fed back to the control system. In some instances, output to the motor or measured output from the motor may be used to calculate an aircraft attitude, angular velocity, and/or angular acceleration. Other on-board or off-board sensors may be used to determine the aircraft dynamics.

Any of the flight control steps may be executed with aid of software that may be provided on-board the aircraft. The software may incorporate or accept values for aircraft configuration parameters. The aircraft configuration parameters may include or be derived from one or more physical characteristics of the aircraft or aircraft model. Thus, the flight control software may be specific to the aircraft or aircraft model, and may provide more accurate control.

Figure 6B:
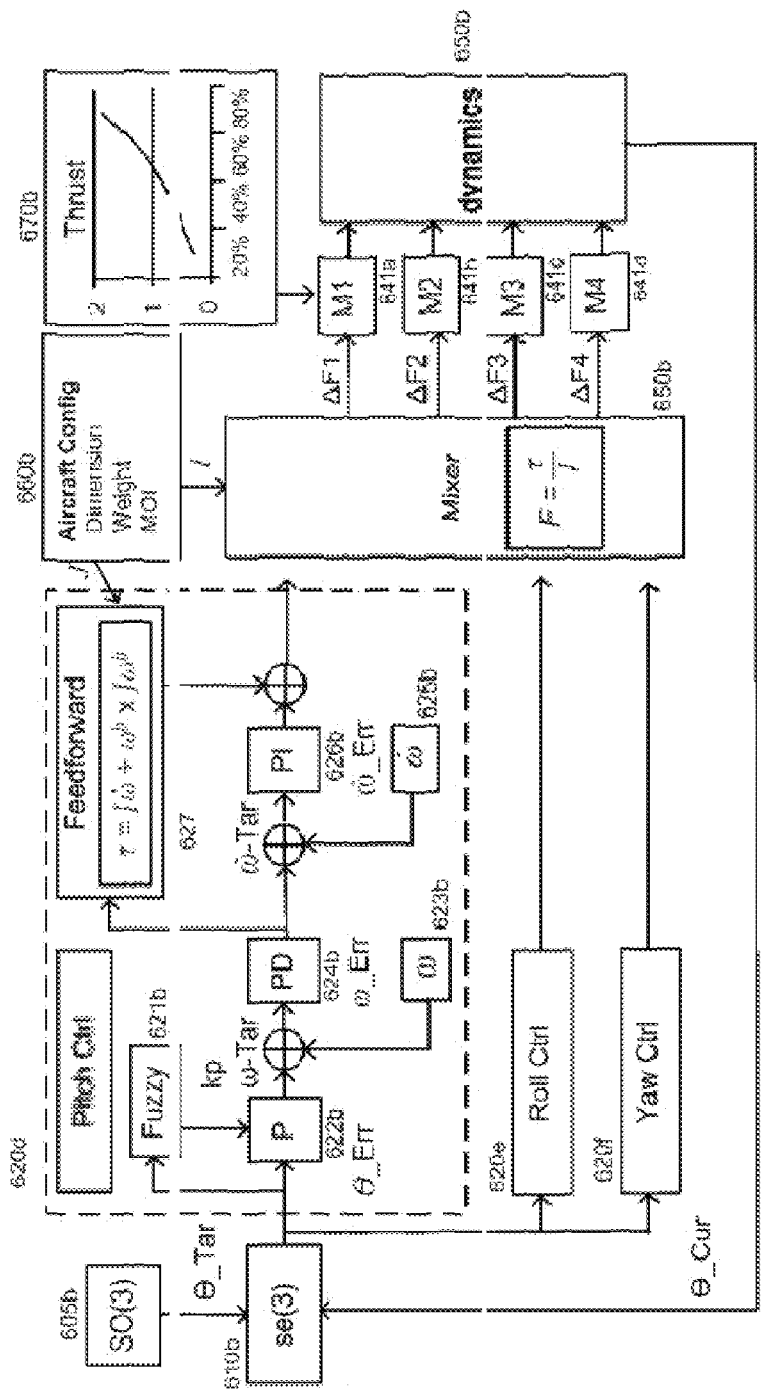
FIG. 6B shows an example of an attitude control scheme that may be implemented by an aircraft, in accordance with an embodiment of the invention.

FIG. 6B shows another example of an attitude control scheme that may be implemented by an aircraft, in accordance with an embodiment of the invention. The attitude control scheme may have one or more features or characteristics of the attitude control scheme described in FIG. 6A.

The target may be to track any attitude command $$g_d \in SO(3)$$

Challenges may arise because the configuration manifold may be non-linear.

A flight planner (se(3)) 610b may be provided to generate a command signal that determines the flight of the aircraft. The flight planner may be provided on-board the aircraft, or may be provided off-board the aircraft and may communicate with the aircraft. In some instances, exponential coordinates (so(3)) may be provided in a linear space. This may be optimal or preferable in terms of geodesic. Optionally, there may be no singularities (Euler angle), and/or no ambiguity (quarternion, two→one).

A remote controller (SO(3)) 605b or other type of flight control device may be provided in accordance with an embodiment of the invention. The remote controller may be operated by a user to control the flight of the aircraft. This may include location of the aircraft, as well as angular orientation of the aircraft. In some instances, the user may directly input instructions regarding aircraft flight in real-time. For example, the user may provide an input to adjust an attitude of the aircraft. In other instances, the user may provide instructions for the aircraft to follow a predetermined or pre-programmed path. In some instances, the remote controller may be separated from the aircraft and may communicate with the aircraft via a wireless connection. In other instances, a flight control device may be built into the aircraft and any description herein of a remote controller may also apply to a flight control device that is part of the aircraft. For example, a user may be on-board the aircraft and provide instructions for flight via the on-board flight control device.

The remote controller 605b may provide a signal indicative of one or more target attitude θ_Tar to the planner 610b. The target attitude may be a target attitude for the aircraft about one, two, or three axes of rotation. For example the target attitude may be indicative of the attitude of the aircraft about the pitch, roll, and yaw axes. The planner may calculate one or more signal to be provided to motors of the aircraft to attempt to achieve the target attitude.

The planner 610b may also receive information about the aircraft dynamics 650b. In some instances, the information about the aircraft dynamics may be provided by one or more sensors. In one example, information about the aircraft dynamics may be provided from one or more inertial sensors (e.g., one or more gyroscopes or accelerometers) from on-board the aircraft. The information about aircraft dynamics may include attitude, angular velocity, and/or angular acceleration about one, two, or three of the following axes: pitch axis, roll axis, and yaw axis. In one example, the current attitude of the aircraft θ_Cur may be conveyed to the planner. The planner may compare the target attitude θ_Tar with the current attitude θ_Cur. This comparison may occur about each of the pitch, roll, and yaw axes. The difference in angle may be determined to be the error in attitude θ_Err.

Although only pitch control 620*d* is shown in detail, the same control scheme may also apply to the roll control 620*e* and the yaw control 620*f*. Any discussion of pitch control or any angular control in general may be applied to any or all of these axes. Any description of attitude, angular velocity, and/or angular acceleration may be applied to any or all of these axes. The three axes may be decoupled from one another.

The error in attitude θ_Err may be used with fuzzy logic 621*b* to control the angle of the aircraft. The control may be a feedback control. In some instances, the feedback control may use proportional, integral, and/or derivative control schemes. The feedback control may be a fuzzy proportional-integral-derivative (PID) control. In some instances, the target attitude may be proportional (P) or PID controlled 622*b*. An angle control loop may be provided.

A target angular velocity ω_Tar may result. The target angular velocity may be compared with a measured angular velocity ω 623*b*. The measured angular velocity may be part of the aircraft dynamics 650*b* that may be measured via one or more sensors. The target angular velocity may be compared with the measured angular velocity to determine an error in angular velocity ω_Err.

The error in angular velocity ω_Err may or may not be used with fuzzy logic to control the angular velocity of the aircraft. The control may be a feedback control. In some instances, the feedback control may use proportional, integral, and/or derivative control schemes. The feedback control may be a proportional-integral-derivative (PID) control. In some instances, the target angular velocity may be proportional-derivative (PD) controlled 624*b*. An angular velocity loop may be provided.

A target change in angular velocity $\dot{\omega}$_Tar may result. The change in angular velocity may be an angular acceleration. The target angular acceleration may be compared with a measured change in angular velocity $\dot{\omega}$ 625*b*. The measured change in angular velocity may be part of the aircraft dynamics 650*b* that may be measured via one or more sensors. The target change in angular velocity may be compared with the measured change in angular velocity to determine an error in the change in angular velocity $\dot{\omega}$_Err.

The error in the change in angular velocity $\dot{\omega}$_Err may or may not be used with fuzzy logic to control the change in angular velocity of the aircraft. The control may be a feedback control. In some instances, the feedback control may use proportional, integral, and/or derivative control schemes. The feedback control may be a proportional-integral-derivative (PID) control. In some instances, the target change in angular velocity may be proportional-integral (PI) or PID controlled 626*b*. An angular acceleration loop may be provided.

A feedforward loop 627*b* may also be provided. The feedforward loop may be provided for change in angular velocity. For example, the target change in angular velocity $\dot{\omega}$_Tar may be used in the feedforward loop. In some instances, one or more aircraft configuration parameters 660*b* that may be derived from one or more physical characteristics of the aircraft may be incorporated into the feedforward loop. For example, a moment of inertia of the aircraft J may be provided to the feedforward loop. In one example, a torque of the aircraft τ may be calculated as $J\dot{\omega}+\omega^b \times J\omega^b$. Thus, the loop for change in angular velocity may use the moment of inertia to calculate the output, and simultaneously according to the current change in angular velocity value and current angular velocity value may perform the HD control as a compensation amount.

Thus, both feedforward and feedback may be used for control of the change in angular velocity (which may optionally be angular acceleration). The feedforward model parameters can improve response time of the control system, while the feedback control can compensate for model errors and dynamic disturbances. Since the angular velocity control can be directly regarded as the entire aircraft's roll torque control, the response time to external disturbances can be even shorter and the suppression effect better than system that do not use this control scheme. The feedforward loop may enable the angular acceleration loop to act as a direct control, so the response time may be short. Disturbances may be directly suppressed, reducing response time.

A mixer 630*b* may be provided in accordance with an embodiment of the invention. The mixer may be part of a flight controller in accordance with an embodiment of the invention. The mixer may include one or more processors that may or may not be the same as the processors used for the flight planner 610*b*. The mixer may receive information pertaining to the attitude for the pitch control, roll control, and/or yaw control. For instance, data after the feedforward and feedback loop pertaining to the change in angular velocity may be provided to the mixer for each of the axes of rotation 620*d*, 620*e*, 620*f*. The overall calculation results may be summed.

The mixer 630*b* may receive information regarding an aircraft configuration parameter 660*b*. The aircraft configuration parameter may be derived from a physical characteristic of the aircraft or aircraft model. In one example, the mixer may receive an axial distance L for the aircraft. The axial distance may be the distance between a motor and an aerodynamic center of the aircraft. Alternatively, the axial distance may be a distance between a propulsion unit and an aerodynamic center of the aircraft. In some instances, an aircraft may have multiple motors 641*a*, 641*b*, 641*c*, 641*d*. The axial distance may be the same for each of the motors. Alternatively, the different motors may have different axial distances. In some instances, the axial distance may be a distance between the aerodynamic center and an axis passing through a propulsion unit and/or rotor in a direction of thrust created by the propulsion unit.

The mixer 630*b* may calculate a desired force to be exerted by each propulsion unit. The force may be calculated based on the aircraft configuration parameter 660*b* and the information from the control schemes for each of the axes of rotation 620*d*, 620*e*, 620*f*. The torque τ calculated in the feedforward loop 627*b* may be used, as well as the axial distance L to calculate the force for each motor. The force F may be calculated as τ/L. The desired additional force to be exerted on each motor may be calculated by the mixer. The desired additional force may be conveyed as a command signal to each motor. The forces for each motor may be the same or may differ. For example, for a first motor M1 641*a*, the desired force may be ΔF1, for a first motor M2 641*b*, the desired force may be ΔF2, for a first motor M3 641*c*, the desired force may be ΔF3, and/or for a first motor M4 641*d*, the desired force may be ΔF4. The motor may operate at a level to generate the desired force, or approximately the desired force. In some instances, a motor lift curve 670*b* may be used in determining motor output. The curve may include lift generated per percentage of motor operation. The motor lift curve may be thrust per percentage operation. The curve may show a non-linear relationship. The motor lift curve may be an aircraft configuration parameter that may be derived from one or more physical characteristics of the aircraft. One or more of the aircraft configuration parameters derived from one or more physical parameters may be non-linear parameters.

The output from the motors 641a, 641b, 641c, 641d may be used to drive one or more propulsion units of the aircraft. This may determine positioning, velocity, and/or acceleration of the aircraft. The output from the motor may affect the attitude, angular velocity, and/or angular acceleration of the aircraft. Any number of motors and/or propulsion units may be provided. The command signal to be generated to determine the output for each motor may be individually determined to direct the aircraft to target attitude from the remote controller.

The dynamics 650b system may register positional information relating to the aircraft. For example, one or more inertial sensors may determine the aircraft attitude, angular velocity, and/or angular acceleration, and the information may be fed back to the control system. In some instances, output to the motor or measured output from the motor may be used to calculate an aircraft attitude, angular velocity, and/or angular acceleration. Other on-board or off-board sensors may be used to determine the aircraft dynamics.

In some embodiments, the kinematics of the system may be considered. A first order fully actuated system may be provided.

$$\dot{g} = g\hat{\omega}^b$$

where:
g=R∈SO(3)
$\omega^b \in \mathbb{R}$ —angular velocity in body frame
Proportional control may be applied.
Geometric control may be provided on SO(3).
For Regulating:

$$(tr(g(0)) \neq -1)$$

$$\hat{\omega}^b = k_p \log(g^{-1})$$

For Tracking:

$$\hat{\omega}^b = k_p \log(g^{-1} g_d)$$

where:
g=R∈SO(3)
g is the current orientation
$g_d$ is the desired orientation
$k_p$ is the controller gain
The dynamics may be:

$$j\dot{\omega}^b + \omega^b \times J\omega^b = u + \Delta$$

where
g=R∈SO(3)
J∈ $\mathbb{R}^{3\times3}$—inertia matrix in body frame
$\omega^b \in \mathbb{R}^3$—angular velocity in body frame
u∈ $\mathbb{R}^3$—control moment in body frame
Δ∈ $\mathbb{R}^3$—disturbances
As previously implemented in the feedforward loop of the control scheme, linear control may be provided. This may include angular velocity control:

$$\omega_e^b = (\omega_d^b - \omega^b)$$

$$\dot{\omega}^b = k_p \omega_e^b + k_d \frac{\omega_e^b}{dt}$$

Angular velocity control may include:

$$\dot{\omega}_e^b = (\dot{\omega}_d^b - \dot{\omega}^b)$$

$$u = k_p(\dot{\omega}_e^b + \int_0^t \dot{\omega}_e^b dt + \omega^b \times J\omega^b$$

Figure 6C:
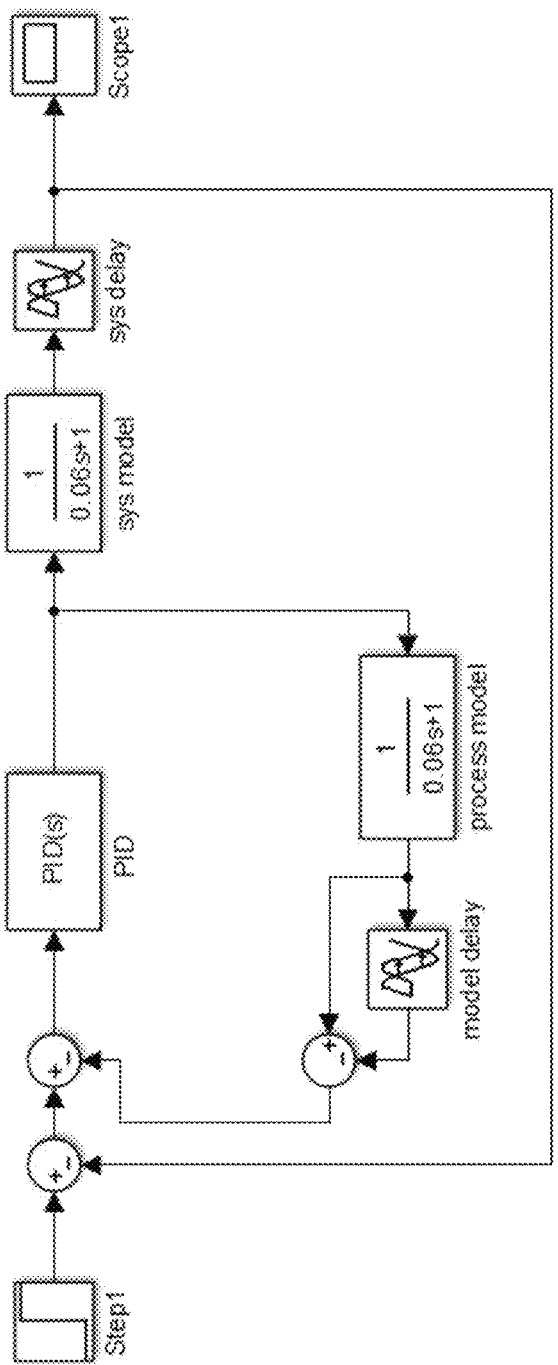
FIG. 6C shows an example of a portion of a control inner loop, in accordance with an embodiment of the invention.

FIG. 6C shows an example of a portion of a control inner loop, in accordance with an embodiment of the invention. System identification of actuators may occur. Actuators may include propellers, rotors, motors, or any other types of actuators. An actuator model for a first order system with time delay may be:

$$G_p(s) = \frac{e^{-\tau s}}{T_\varphi s + 1}$$

FIG. 6C shows an example of a Smith predictor that may be utilized in a control scheme. The Smith predictor may be part of an inner loop control. The Smith predictor may predict and correct for dynamics of the aircraft. The Smith predictor may be a predictive controller that can be used for systems with pure time delay.

Figure 6D:
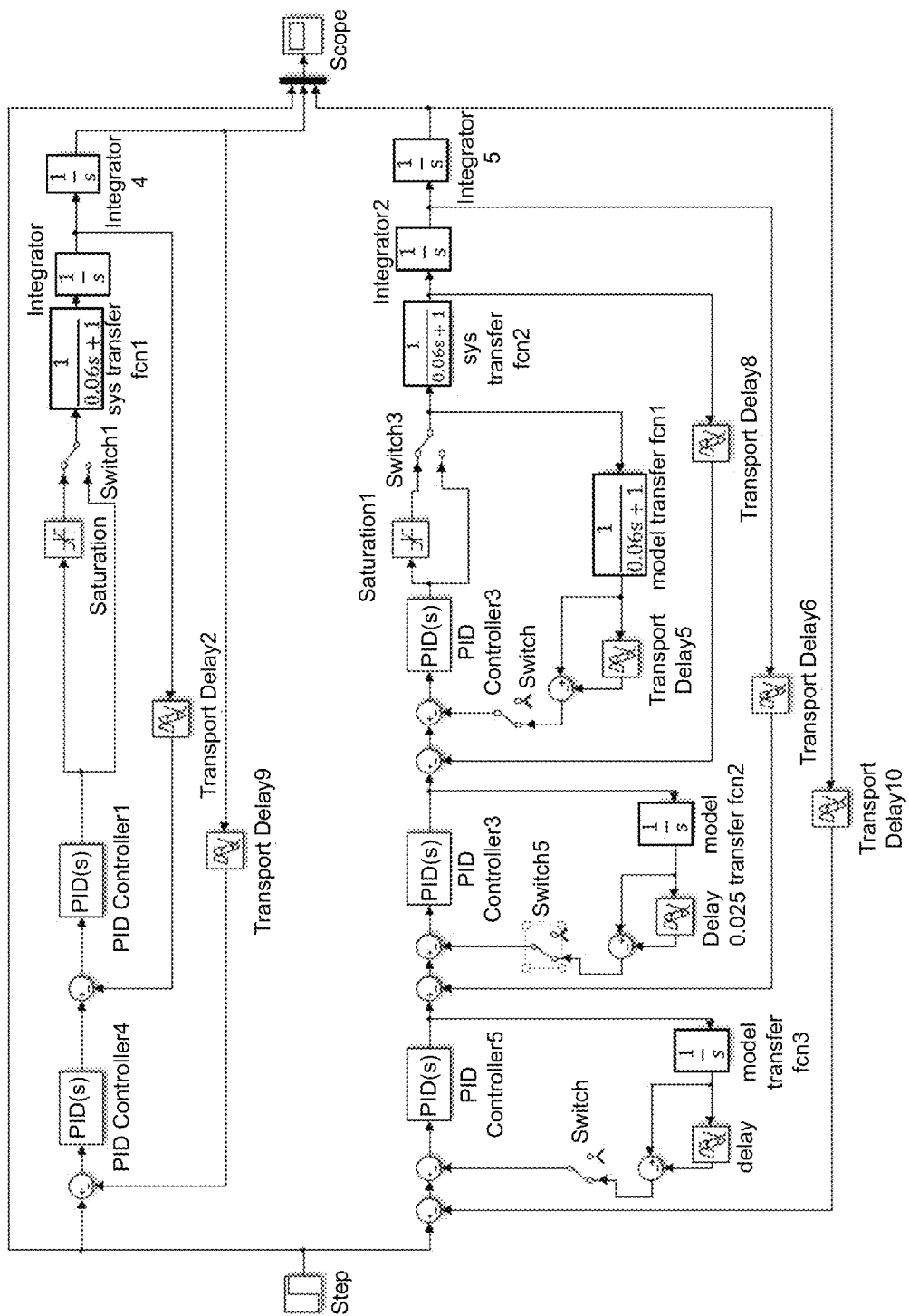
FIG. 6D shows an example of an attitude control scheme in accordance with an embodiment of the invention.

FIG. 6D shows an example of an attitude control scheme in accordance with an embodiment of the invention. A step signal (e.g., Step) may be provided as an input. A DC signal may be employed. An upper part of the shown attitude control scheme may be a conventional controller design, while the lower part may be a proposed control design, using a cascade control with a predictor.

A portion of the control scheme may include one or more PID controllers (e.g., PID Controller4, PID Controller1). These may include an inner PID loop and outer PID loop. Any number of PID loops may be provided (e.g., 1, 2, 3, 4, 5 or more loops). In some embodiments, one or more of the PID loops may be nested within one another. A switch (e.g., Switch) may be provided. The switch may change positions when signal saturation occurs. The resulting signal may undergo a system transfer function (e.g., sys transfer fcn1) and interact with one or more integrator (e.g., Integrator, Integrator4). In the feedback process there may be transport delay (e.g., Transport Delay2, Transport Delay9).

The portion of the control scheme may be a controller used to control angle based on the angle and/or angular velocity of the aircraft.

Another portion of the control scheme may include one or more PID controllers (e.g., PID Controller2, PID Controller3, PID Controller 5). This may include one or more inner PID loops and/or outer PID loops. Any number of PID loops may be provided that may be nested within one another. A switch (e.g., Switch3) may be provided. The switch may change positions when signal saturation occurs. The resulting signal may undergo a system transfer function (e.g., sys transfer fcn2) and interact with one or more integrator (e.g., Integrator2, Integrator5). In the feedback process there may be transport delay (e.g., Transport Delay5, Transport Delay6, Transport Delay8, Transport Delay10). In the feedback there may be model transfer functions (e.g., model transfer fcn1, model transfer fcn2, model transfer fcn3) and associated switches (e.g., Switch4, Switch5, Switch).

The other portion of the control scheme may be a controller that may control angle of an aircraft based on the angle, angular velocity, and/or angular acceleration of the aircraft. Additionally, a Smith predictor may be included in the portion of the control scheme.

In some embodiments, output may be provided to a scope (e.g., Scope). Results of using improved control schemes that incorporate these additional features may be shown in FIG. 8.

Figure 7A:
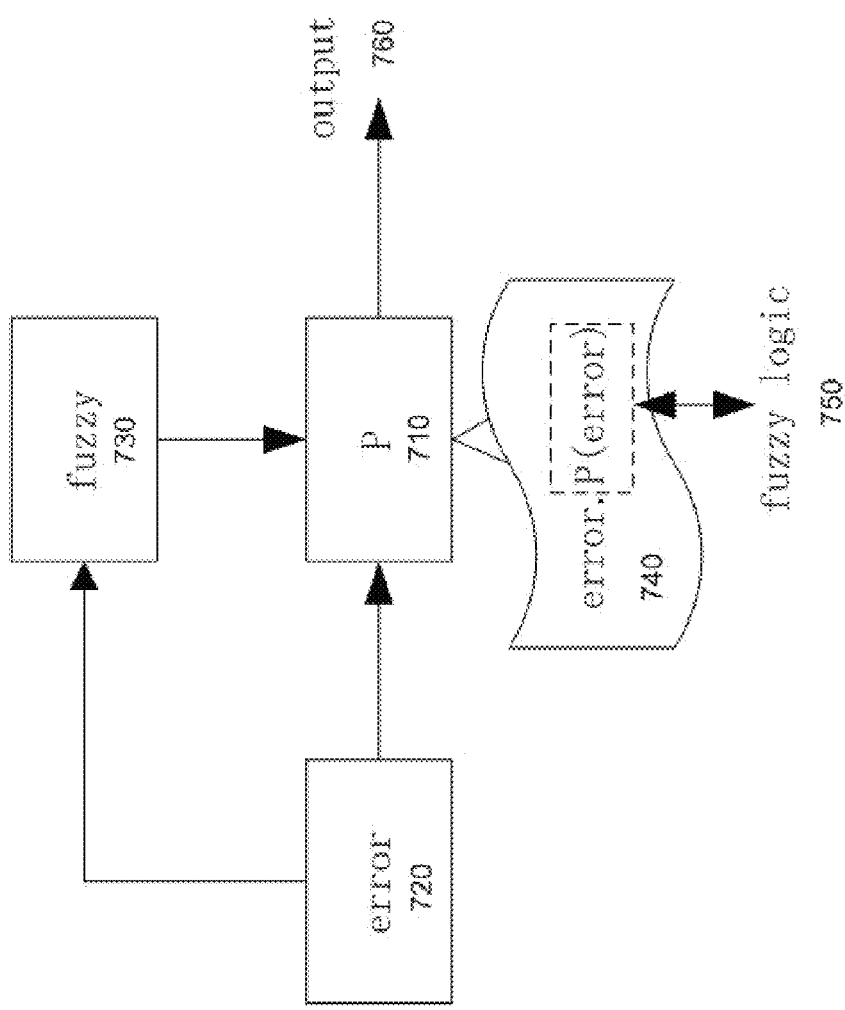
FIG. 7A shows an example of tracking error, in accordance with an embodiment of the invention.

FIG. 7A shows an example of tracking error, in accordance with an embodiment of the invention. This may be incorporated as part of the attitude control as previously described. A target may be compared with a feedback value to provide error. This may be done for angle, angular velocity, and/or angular acceleration. This may be done over one or more axes, such as a pitch axis, roll axis, or yaw axis.

The error may or may not be used with fuzzy logic to control the attitude feature (e.g., angle, angular velocity, or angular acceleration) of the aircraft. The control may be a feedback control. In some instances, the feedback control may use proportional, integral, and/or derivative control schemes. The feedback control may be a proportional-integral-derivative (PID) control. In some instances, the target attitude feature may be proportional (P) controlled 710. The error 720 in the attitude feature may be provided to the controller 710. Fuzzy logic 730 may be employed to control the attitude feature (e.g., angle, angular velocity, angular acceleration) of the aircraft.

Optionally, a feedback value may be provided. For example, an error value of the controlled attitude feature error.P(error) 740 may be provided. In some instances fuzzy logic 750 may be employed in determining the error 740 value. The error value may be determined with aid of one or more measured aircraft dynamics. For example, an attitude feature of the aircraft may be measured with aid of one or more sensor. The gain of the controller may be adjusted dynamically by the fuzzy logic engine. This scheme may advantageously improve the response speed when the error is large. At the same time, the scheme may improve stability when the error is small.

Figure 7B:
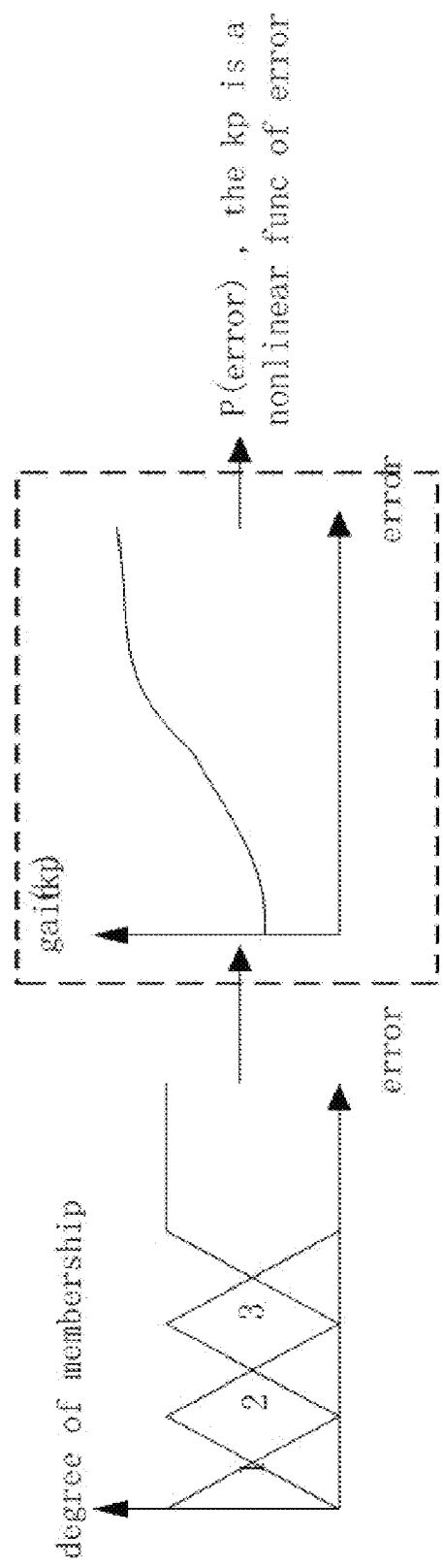
FIG. 7B further shows an example of tracking error, in accordance with an embodiment of the invention.

FIG. 7B further shows an example of tracking error, in accordance with an embodiment of the invention. Examples of the degree of membership are displayed. Furthermore, the proportional gain (kp) as a function of error may be calculated and/or determined. The proportional gain kp may be a nonlinear function of error. This non-linear function may be used in the aircraft attitude control. The non-linear proportional gain function may be used in the error tracking of the aircraft control.

Figure 8:
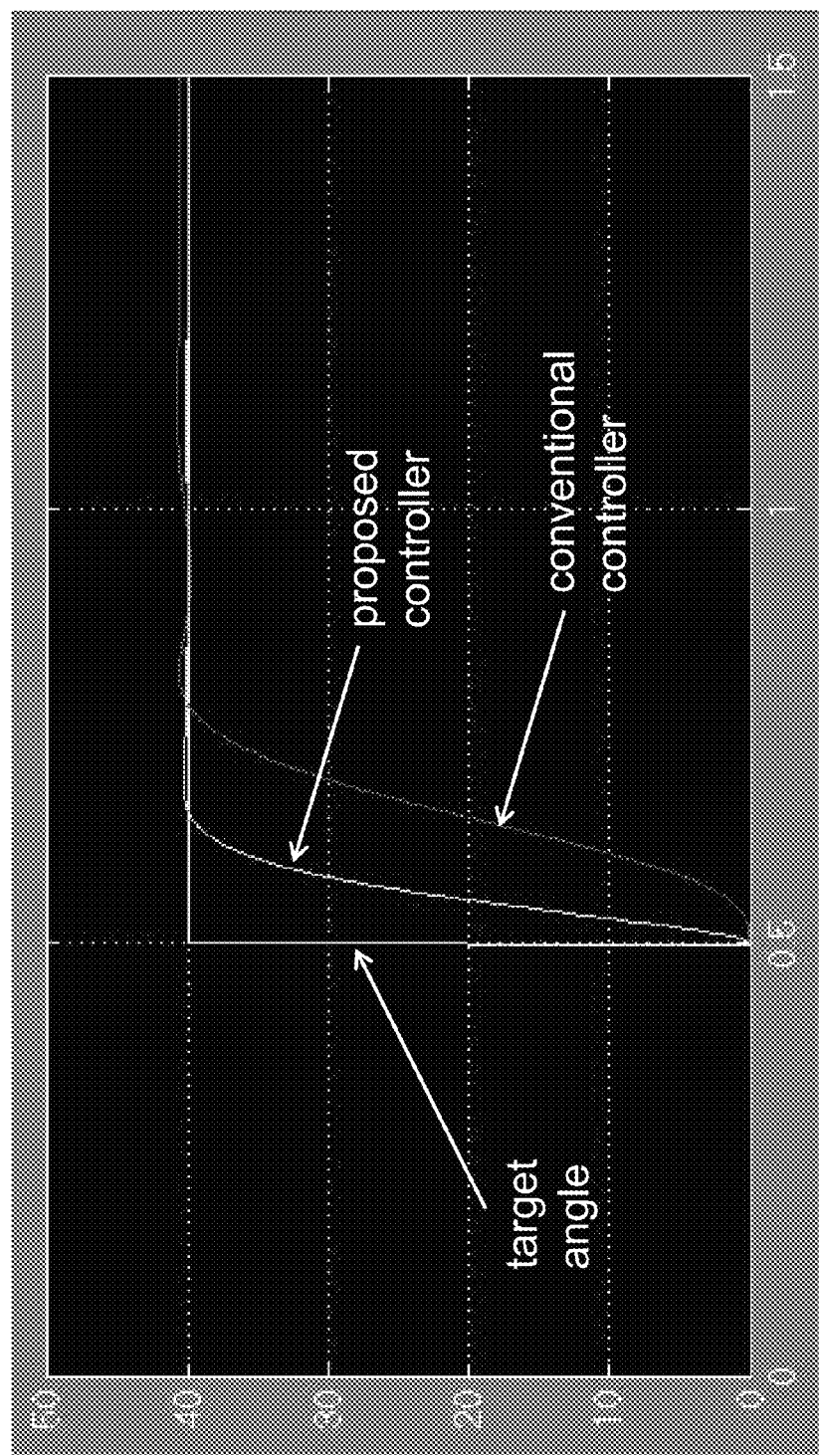
FIG. 8 shows a comparison between a response of a controller provided in accordance with an embodiment of the invention, as compared to a conventional controller.

FIG. 8 shows a comparison between a response of a controller provided in accordance with an embodiment of the invention, as compared to a conventional controller. The controller may give a faster response and smaller overshoot than a conventional controller. Moreover, it may use less time to settle down in a steady state.

A target angle may be shown. For example, it may be desirable to reach a target angle having a particular degree value at a particular point in time. For example, at 0.5 units of time in, a command may be provided that changes the target angle to 40 (e.g., 40 degrees). Responses for a proposed controller as described herein and a conventional controller are provided. The proposed controller may implement a control scheme as described elsewhere herein. The proposed controller may take physical characteristics of an aircraft into account. The proposed controller may use a feedforward and feedback loop about acceleration. In some instances, the conventional controller does not take physical characteristics of an aircraft into account. The conventional controller does not calculate a moment of inertia of the aircraft and incorporate the moment of inertia into the control scheme. The conventional controller may optionally not include a feedforward and feedback loop about acceleration.

A response of the proposed controller may be faster than a response of a conventional controller, as illustrated. In some instances, the response of the proposed controller may be about two times faster than the response of a conventional controller. For example, the proposed controller may permit the aircraft to reach the target angle about 2 times faster than the aircraft using the conventional controller. In some instances, the proposed controller may reach the target angle about 1.1 times faster, 1.2 times faster, 1.3 times faster, 1.5 times faster, 2 times faster, 2.5 times faster, 3 times faster, 3.5 times faster, 4 times faster, 5 times faster, 6 times faster, 7 times faster, or 10 times faster than the conventional controller. Thus, the proposed control scheme as described herein may permit the aircraft to respond more rapidly to reach a target angle.

The proposed controller may have less oscillation than the conventional controller. The proposed controller may have little or no oscillation. Oscillation may refer to variation in the attitude of an aircraft around the target angle. For example, when an aircraft is approaching a target angle, there may be some overshot and/or overcompensation that may cause some variation before the aircraft reaches and stabilizes at the target angle.

The methods and systems described herein may provide improved attitude control of aircrafts over one, two, or three axes of rotation. Simplified parameter tuning may be provided. When assessing parameters for aircraft performance, the parameter assessment can be performed directly by a flight controller, which may greatly reduce parameter tuning time over traditional systems. Changes to or variations in aircraft dimensions and weight may be accommodated. The flight control parameter tuning may be completed by directly adjusting the aircraft's fundamental parameters, easily and reliably. Thus, the control system may take different models of aircrafts with different physical characteristics into account, or physical changes that may occur to an existing aircraft.

Additionally, the angular acceleration loop as described herein, can enhance dynamic tracking performance and disturbance resistance. Since the angular acceleration loop control may act as a direct control, the response time may be shortened, and may have strong disturbance resistance characteristics, compared to traditional control systems. For instance, traditional systems use angular velocity loop control, and when the plane has not yet produced roll velocities, delay in control may be provided. By using the angular acceleration loop as described, disturbances can be directly suppressed, reducing response time.

The systems, devices, and methods described herein can be applied to a wide variety of movable objects. As previously mentioned, any description herein of an aerial vehicle may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 9:
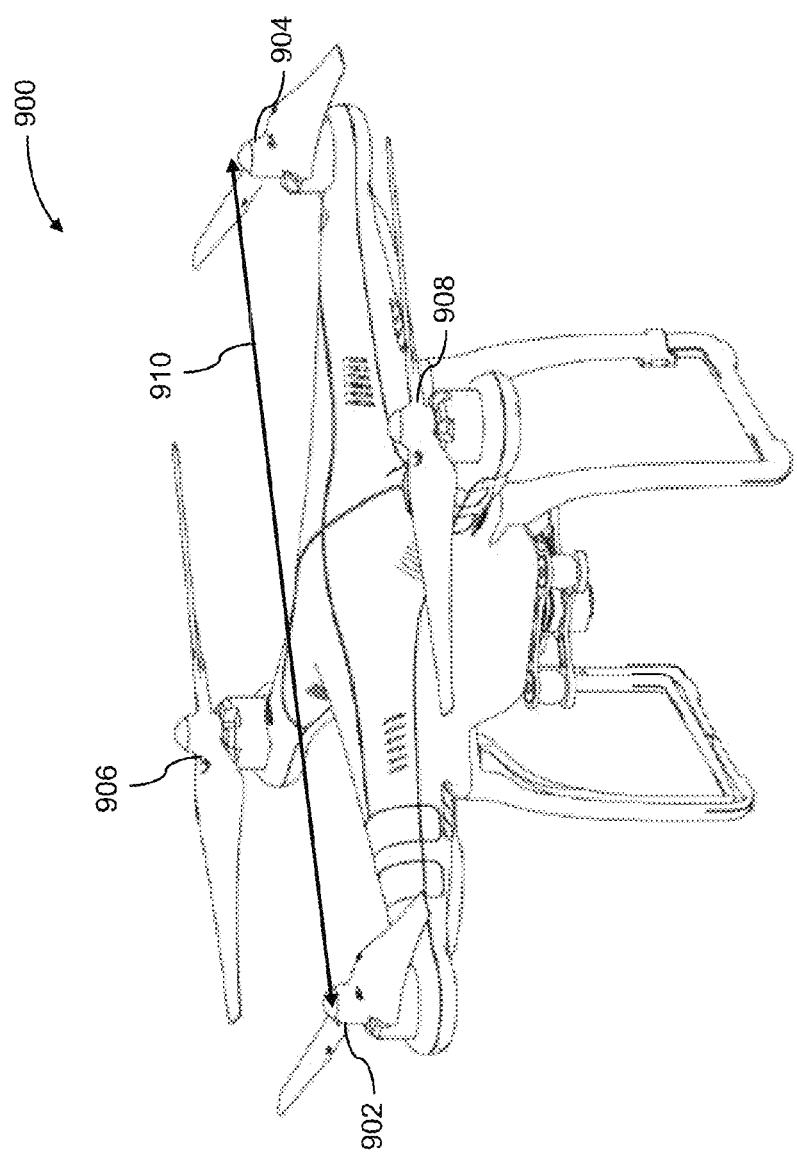
FIG. 9 illustrates an unmanned aerial vehicle, in accordance with an embodiment of the invention.

FIG. 9 illustrates an unmanned aerial vehicle (UAV) 900, in accordance with embodiments of the present invention. The UAV may be an example of a movable object as described herein. The UAV 900 can include a propulsion system having four rotors 902, 904, 906, and 908. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 2 m, or less than equal to 5 m. In some embodiments, the length 910 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
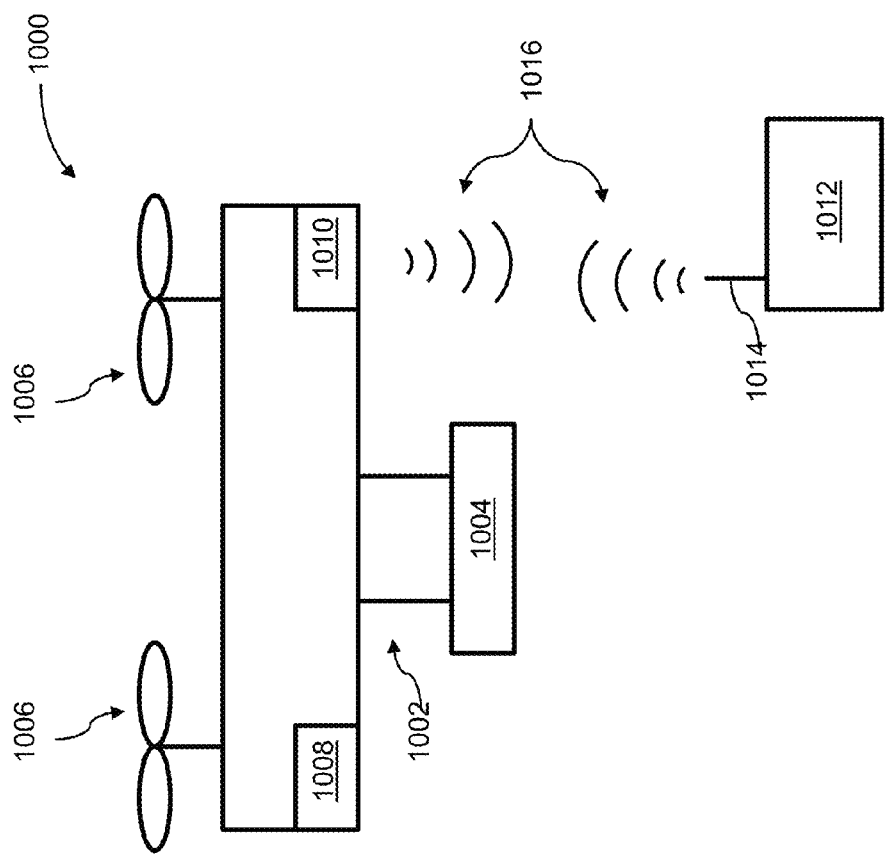
FIG. 10 illustrates a movable object including a carrier and a payload, in accordance with an embodiment of the invention.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
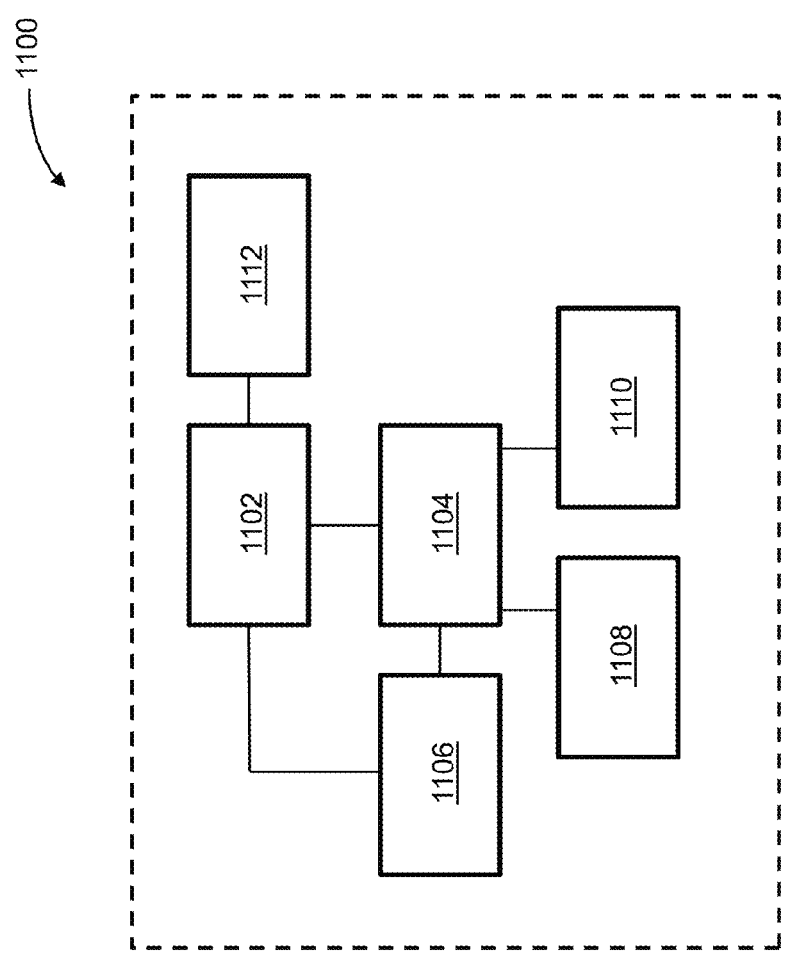
FIG. 11 is a schematic illustration by way of block diagram of a system for controlling a movable object, in accordance with an embodiment of the invention.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for controlling aircraft attitude, said method comprising:
   (a) calculating one or more aircraft configuration parameters based on one or more physical characteristics of an aircraft;
   (b) receiving, at a processor, a signal indicative of a target attitude of the aircraft;
   (c) generating, with aid of the processor, a command signal to be delivered to at least one actuator of the aircraft operably coupled to one or more propulsion units of the aircraft, wherein said generation is based on (1) the signal indicative of the target attitude of (b), and (2) the one or more aircraft configuration parameters of (a), and where said generation further uses a feedback control scheme that includes an angular acceleration loop with angular acceleration feedback;
   (d) measuring, with aid of one or more sensors operably coupled to the aircraft, dynamics of the aircraft resulting from actuation of the one or more propulsion units; and
   (e) feeding the dynamics to the processor to yield the feedback control scheme that adjusts or confirms the command signal of (c).

2. The method of claim 1, wherein the aircraft is an unmanned aerial vehicle.

3. The method of claim 1, wherein the aircraft includes a plurality of actuators operably coupled to a plurality of propulsion units, wherein the propulsion units include rotors that generate lift for the aircraft.

4. The method of claim 1, wherein the signal indicative of a target attitude of the aircraft is received from a remote controller over a wireless connection.

5. The method of claim 1, wherein the one or more physical characteristics are input by a user.

6. The method of claim 1, wherein the one or more physical characteristics of the aircraft include a physical dimension and weight.

7. The method of claim 6, further comprising calculating an aerodynamic center and center of gravity of the aircraft.

8. The method of claim 6, further comprising calculating a moment of inertia for the aircraft.

9. The method of claim 8, wherein the calculation using the feedback controls system includes a feedforward calculation using the moment of inertia of the aircraft.

10. The method of claim 1, wherein the calculation using the feedback control scheme is performed for aircraft attitude about a pitch axis, roll axis, and yaw axis.

11. The method of claim 10, further comprising combining, using a mixer, results of the calculations about the pitch axis, roll axis, and yaw axis, and an aircraft configuration parameter to calculate the command signal to be delivered to the at least one actuator.

12. The method of claim 11, wherein the aircraft configuration parameter is a distance from the actuator to an aerodynamic center of the aircraft.

13. The method of claim 1, wherein the one or more sensors are inertial sensors.

14. The method of claim 1, wherein the dynamics of the aircraft include the attitude of the aircraft with respect to at least one axis, the angular velocity with respect to at least one axis, and the angular acceleration with respect to the at least one axis.

15. A method for controlling aircraft attitude, said method comprising:
  (a) assessing, with aid of a processor, a non-linear relationship between thrust of an actuator and actuator output;
  (b) receiving, at the processor, a signal indicative of a target attitude of an aircraft;
  (c) generating, with aid of the processor, a command signal to be delivered to at least one actuator of the aircraft operably coupled to one or more propulsion units of the aircraft, wherein said generation is based on (1) the signal indicative of the target attitude of (b), and (2) the non-linear relationship of (a), and wherein said generation uses a feedback control scheme that includes an angular acceleration loop with angular acceleration feedback;
  (d) measuring, with aid of one or more sensors operably coupled to the aircraft, dynamics of the aircraft resulting from actuation of the one or more propulsion units; and
  (e) feeding the dynamics to the processor to yield the feedback control scheme that adjusts or confirms the command signal of (c).

16. The method of claim 15, wherein the aircraft is an unmanned aerial vehicle.

17. The method of claim 15, wherein the aircraft includes a plurality of actuators operably coupled to a plurality of propulsion units, wherein the propulsion units include rotors that generate lift for the aircraft.

18. The method of claim 15, wherein the signal indicative of a target attitude of the aircraft is received from a remote controller over a wireless connection.

19. The method of claim 15, wherein the non-linear relationship is input by a user.

20. The method of claim 15, wherein the non-linear relationship is calculated during a calibration of one or more actuator of the aircraft.

21. The method of claim 15, further comprising calculating an aerodynamic center and center of gravity of the aircraft based on one or more physical characteristics of the aircraft.

22. The method of claim 21, further comprising calculating a moment of inertia for the aircraft based on the physical characteristics of the aircraft.

23. The method of claim 22, wherein the calculation using the feedback controls system includes a feedforward calculation using the moment of inertia of the aircraft.

24. The method of claim 15, wherein the one or more sensors are inertial sensors.

25. A method for controlling aircraft attitude, said method comprising:
  (a) receiving, at the processor, a signal indicative of a target attitude of an aircraft;
  (b) generating, with aid of the processor, a command signal to be delivered to at least one actuator of the aircraft operably coupled to one or more propulsion units of the aircraft, wherein said generation is based on the signal indicative of the target attitude of (a), and wherein said generation uses a feedback control scheme that includes (1) an angular acceleration loop with angular acceleration feedback and (2) direct feedforward calculation based on a target acceleration;
  (c) measuring, with aid of one or more sensors operably coupled to the aircraft, dynamics of the aircraft resulting from actuation of the one or more propulsion units; and
  (d) feeding the dynamics to the processor to yield the feedback control scheme that adjusts or confirms the command signal of (b).

26. The method of claim 25, wherein the aircraft is an unmanned aerial vehicle and includes a plurality of actuators operably coupled to a plurality of propulsion units, wherein the propulsion units include rotors that generate lift for the aircraft.

27. The method of claim 25, further comprising calculating an aerodynamic center and center of gravity of the aircraft based on one or more physical characteristics of the aircraft.

28. The method of claim 27, further comprising calculating a moment of inertia for the aircraft based on the physical characteristics of the aircraft, wherein the feedforward calculation uses the moment of inertia of the aircraft.

29. The method of claim 25, wherein the calculation using the feedback control scheme is performed for aircraft attitude about a pitch axis, roll axis, and yaw axis; and further comprising combining, using a mixer, results of the calculations about the pitch axis, roll axis, and yaw axis, and an aircraft configuration parameter to calculate the command signal to be delivered to the at least one actuator.

30. The method of claim 25, wherein the dynamics of the aircraft include the attitude of the aircraft with respect to at least one axis, the angular velocity with respect to at least one axis, and the angular acceleration with respect to the at least one axis.

* * * * *